US010495458B2

(12) United States Patent
Kubota et al.

(10) Patent No.: US 10,495,458 B2
(45) Date of Patent: Dec. 3, 2019

(54) IMAGE PROCESSING SYSTEM FOR VEHICLE

(71) Applicant: AISIN SEIKI KABUSHIKI KAISHA, Kariya-shi, Aichi-ken (JP)

(72) Inventors: Naotaka Kubota, Kariya (JP); Tetsuya Maruoka, Okazaki (JP); Yoji Inui, Ama-gun (JP); Takashi Hiramaki, Nagoya (JP); Osamu Kimura, Nagoya (JP); Itsuko Ohashi, Nagoya (JP)

(73) Assignee: AISIN SEIKI KABUSHIKI KAISHA, Kariya-shi, Aichi-ken (JP)

(*) Notice: Subject to any disclaimer, the term of this patent is extended or adjusted under 35 U.S.C. 154(b) by 262 days.

(21) Appl. No.: 15/614,783

(22) Filed: Jun. 6, 2017

(65) Prior Publication Data
US 2018/0066941 A1  Mar. 8, 2018

(30) Foreign Application Priority Data

Sep. 8, 2016  (JP) .................................. 2016-175890

(51) Int. Cl.
*G06K 9/00* (2006.01)
*G01C 9/04* (2006.01)
(Continued)

(52) U.S. Cl.
CPC .................. *G01C 9/04* (2013.01); *B60R 1/00* (2013.01); *G06T 17/05* (2013.01); *H04N 7/181* (2013.01);
(Continued)

(58) Field of Classification Search
None
See application file for complete search history.

(56) References Cited

U.S. PATENT DOCUMENTS

| 2014/0063197 A1* | 3/2014 | Yamamoto ............. G08G 1/166 348/46 |
| 2016/0059700 A1 | 3/2016 | Watanabe et al. |

(Continued)

FOREIGN PATENT DOCUMENTS

| EP | 2 990 265 A1 | 3/2016 |
| JP | 5369465 B2 | 12/2013 |

(Continued)

OTHER PUBLICATIONS

Extended European Search Report issued in European Application No. 17169410.2 dated Oct. 27, 2017.

*Primary Examiner* — Wei Wen Yang
(74) *Attorney, Agent, or Firm* — Sughrue Mion, PLLC

(57) ABSTRACT

An image processing system for a vehicle includes: a viewpoint image generating unit that generates a viewpoint image viewed from a predetermined virtual viewpoint when assumed that a surrounding image corresponding to surrounding image data is projected on a virtual projection plane whose arrangement position has been set in advance, based on inclination information corresponding to an inclination of the vehicle and the surrounding image data obtained by capturing an image of a periphery of the vehicle; and an output image generating unit that generates and outputs output image data in order to cause a display device to display an output image in which an own vehicle model image having an inclination according to an inclination of the vehicle corresponding to the inclination information is superimposed on the viewpoint image.

5 Claims, 23 Drawing Sheets

(51) Int. Cl.
*G06T 17/05* (2011.01)
*H04N 7/18* (2006.01)
*B60R 1/00* (2006.01)

(52) U.S. Cl.
CPC ... *B60R 2300/302* (2013.01); *B60R 2300/602* (2013.01); *B60R 2300/605* (2013.01)

(56) References Cited

U.S. PATENT DOCUMENTS

| | | | |
|---|---|---|---|
| 2016/0070102 A1* | 3/2016 | Takamatsu | G02B 27/0149 359/631 |
| 2016/0182863 A1 | 6/2016 | Watanabe et al. | |
| 2017/0008521 A1* | 1/2017 | Braunstein | G01C 21/32 |
| 2018/0001887 A1* | 1/2018 | Watanabe | B60W 40/11 |

FOREIGN PATENT DOCUMENTS

| | | |
|---|---|---|
| JP | 2016-049868 A | 4/2016 |
| JP | 2016-119570 A | 6/2016 |

\* cited by examiner

FIG.5
(a) TOP PLAN VIEW
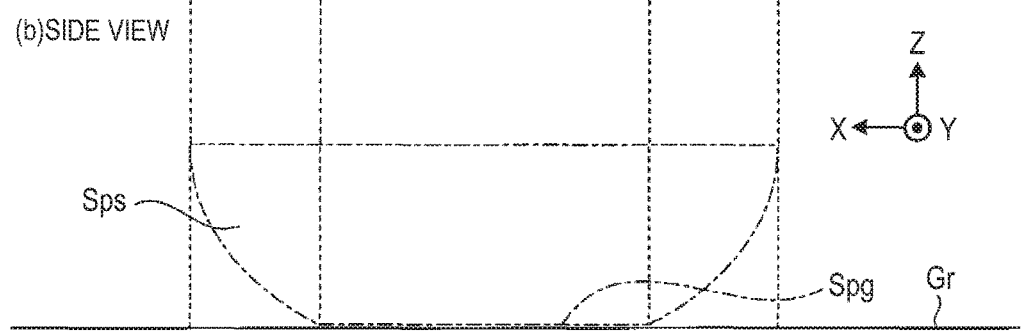
(b) SIDE VIEW
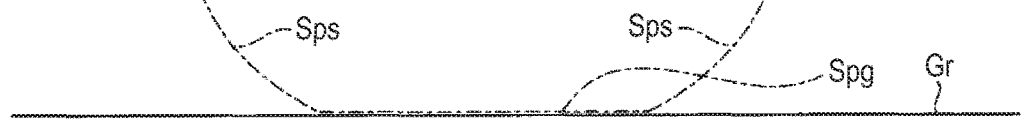
(c) CROSS-SECTIONAL VIEW TAKEN ALONG LINE A-A $\theta_1 < \theta_{th} < \theta_2$

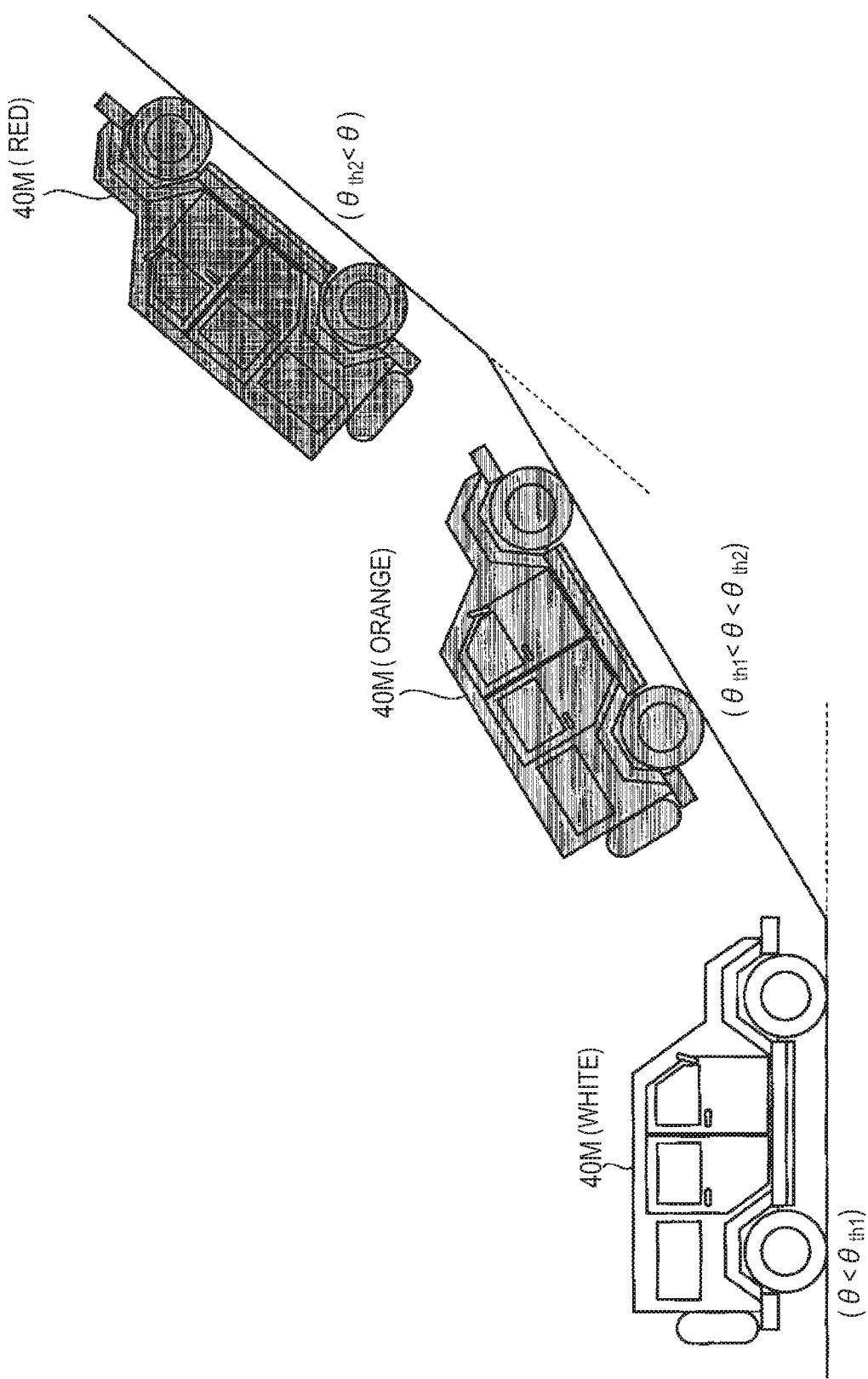

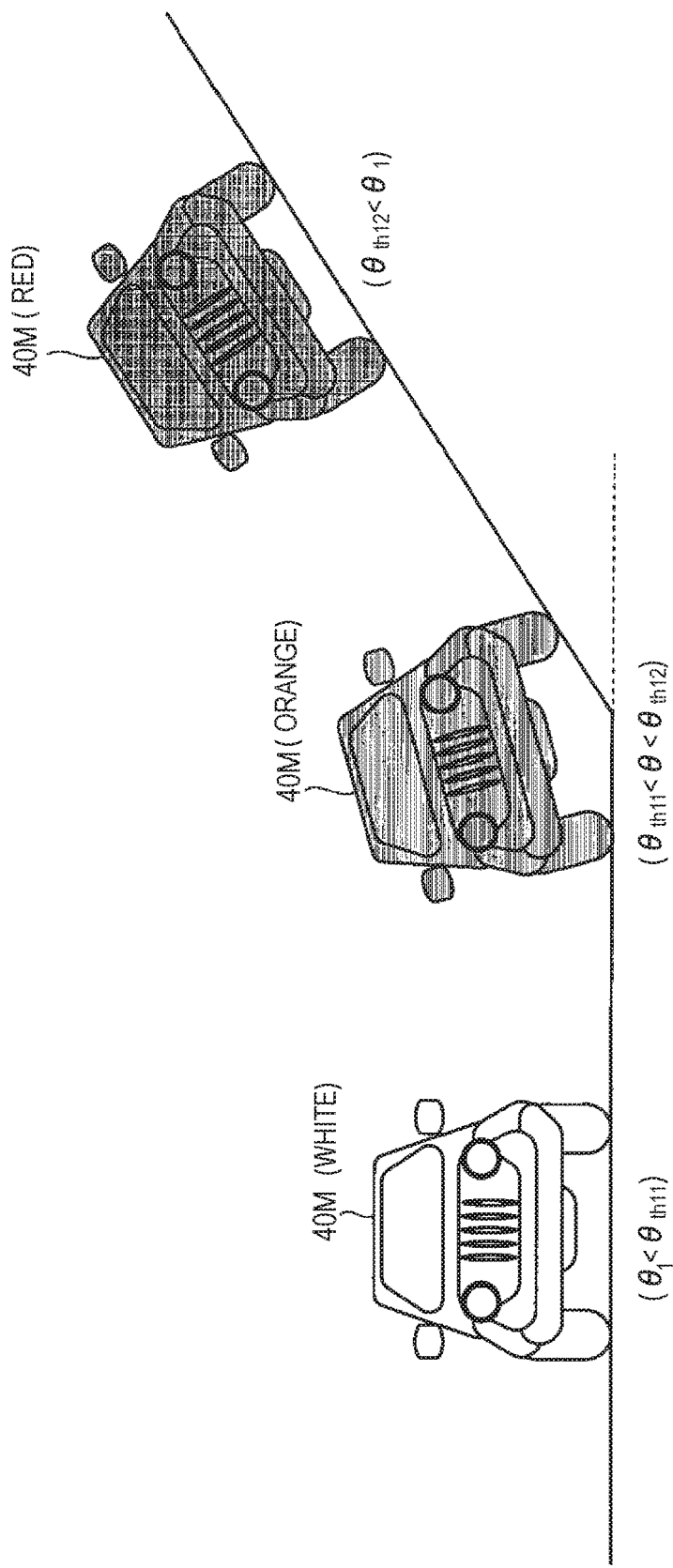

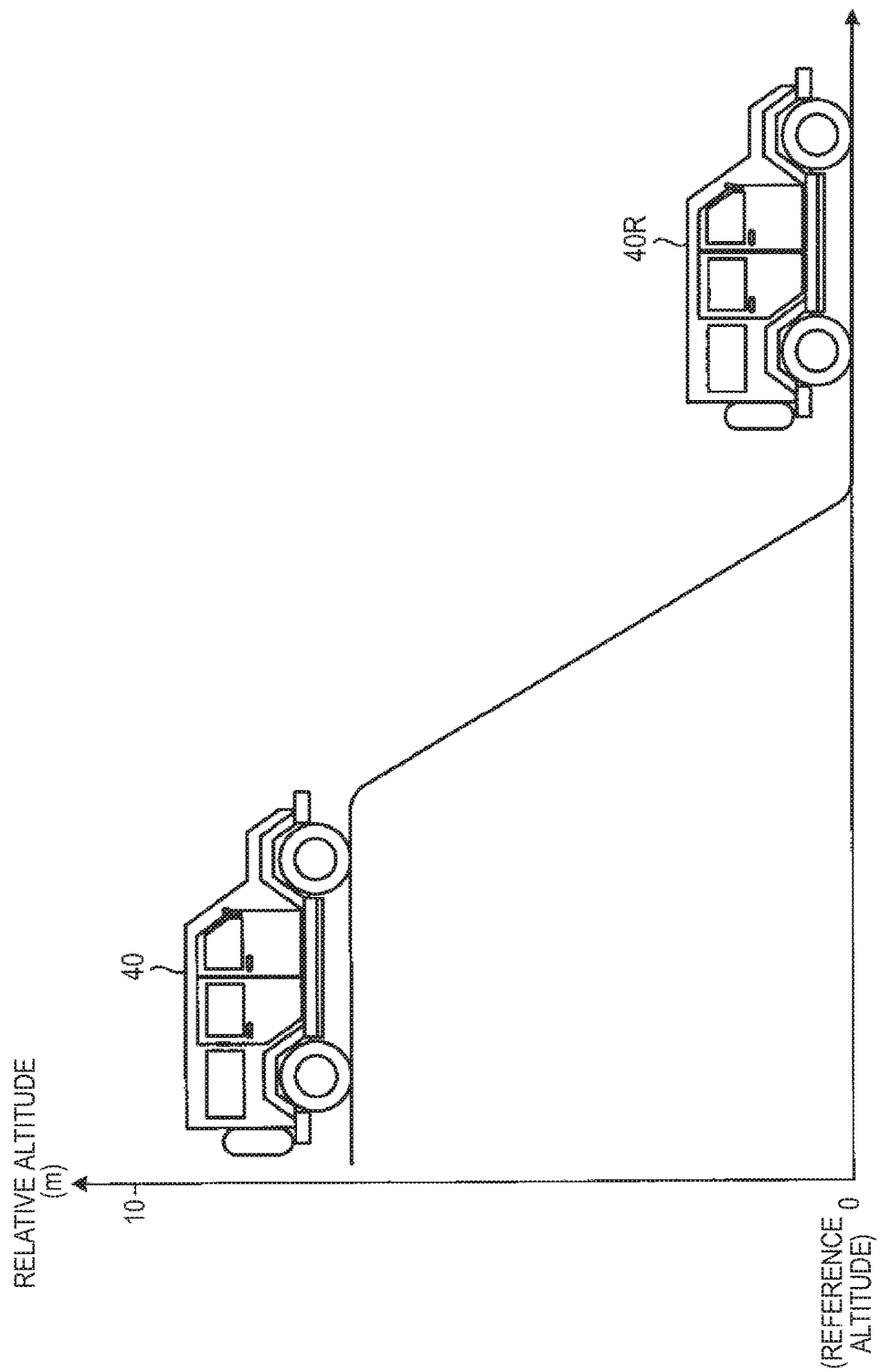

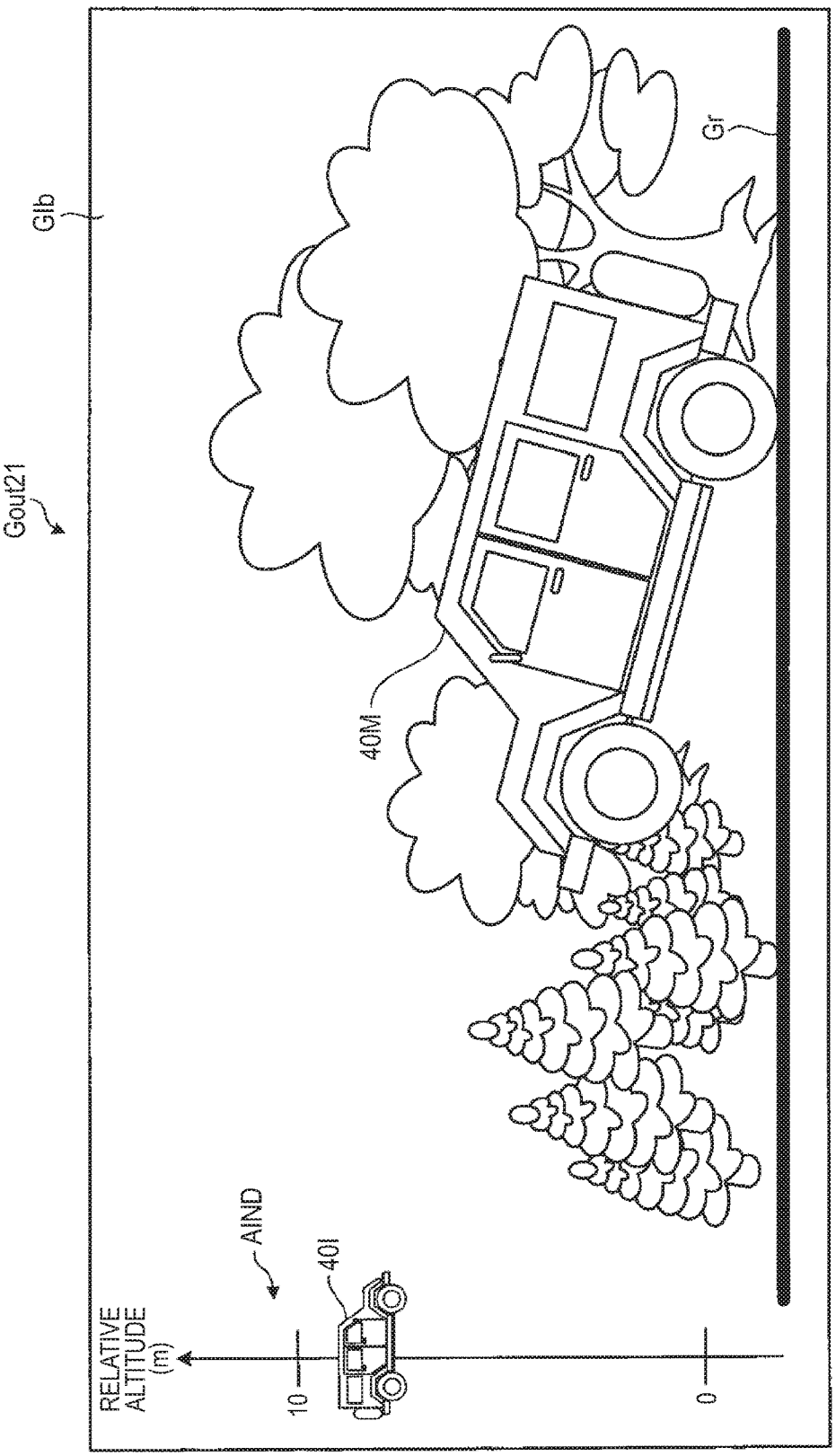

IMAGE PROCESSING SYSTEM FOR VEHICLE

CROSS REFERENCE TO RELATED APPLICATIONS

This application is based on and claims priority under 35 U.S.C. § 119 to Japanese Patent Application 2016-175890, filed on Sep. 8, 2016, the entire contents of which are incorporated herein by reference.

TECHNICAL FIELD

An exemplary embodiment of this disclosure relates to an image processing system for a vehicle.

BACKGROUND DISCUSSION

In the related art, there has been known an image processing system which produces image data that stereoscopically reflect captured images, and converts the image data into an image viewed from a set viewpoint, thereby obtaining the converted image as an output image. See, e.g., Japanese Patent No. 5369465.

There is a case in which this type of image processing system is mounted on a vehicle to take a scene around the vehicle as an image viewed from a predetermined viewpoint, and display the image in a state where a model image of the vehicle is also included in the image.

In this case, since an imaging device for capturing a surrounding image is mounted on the vehicle, the surrounding image, which is a background, is obliquely displayed when the vehicle is in an inclined state, and as a result, there is a problem in that it is difficult to recognize the inclined state of the own vehicle.

Thus, a need exists for an output image which is not susceptible to the drawback mentioned above.

SUMMARY

An image processing system for a vehicle according to an aspect of this disclosure includes: a viewpoint image generating unit that generates a viewpoint image viewed from a predetermined virtual viewpoint when it is assumed that a surrounding image corresponding to surrounding image data is projected on a virtual projection plane whose arrangement position has been set in advance, based on inclination information corresponding to an inclination of the vehicle and the surrounding image data obtained by capturing an image of a periphery of the vehicle; and an output image generating unit that generates and outputs output image data in order to cause a display device to display an output image in which an own vehicle model image having an inclination according to an inclination of the vehicle corresponding to the inclination information is superimposed on the viewpoint image.

BRIEF DESCRIPTION OF THE DRAWINGS

The foregoing and additional features and characteristics of this disclosure will become more apparent from the following detailed description considered with the reference to the accompanying drawings, wherein:

FIG. 5 illustrates explanatory views of a virtual projection plane;

FIG. 15 is an explanatory view of a first display example of a fifth exemplary embodiment;

FIG. 16 is an explanatory view of a second display example of the fifth exemplary embodiment;

FIG. 17 is an explanatory view of a sixth exemplary embodiment;

FIG. 18 is an explanatory view of an output image of the sixth exemplary embodiment;

DETAILED DESCRIPTION

Next, exemplary embodiments will be described with reference to the drawings.

[1] First Exemplary Embodiment

Figure 1:
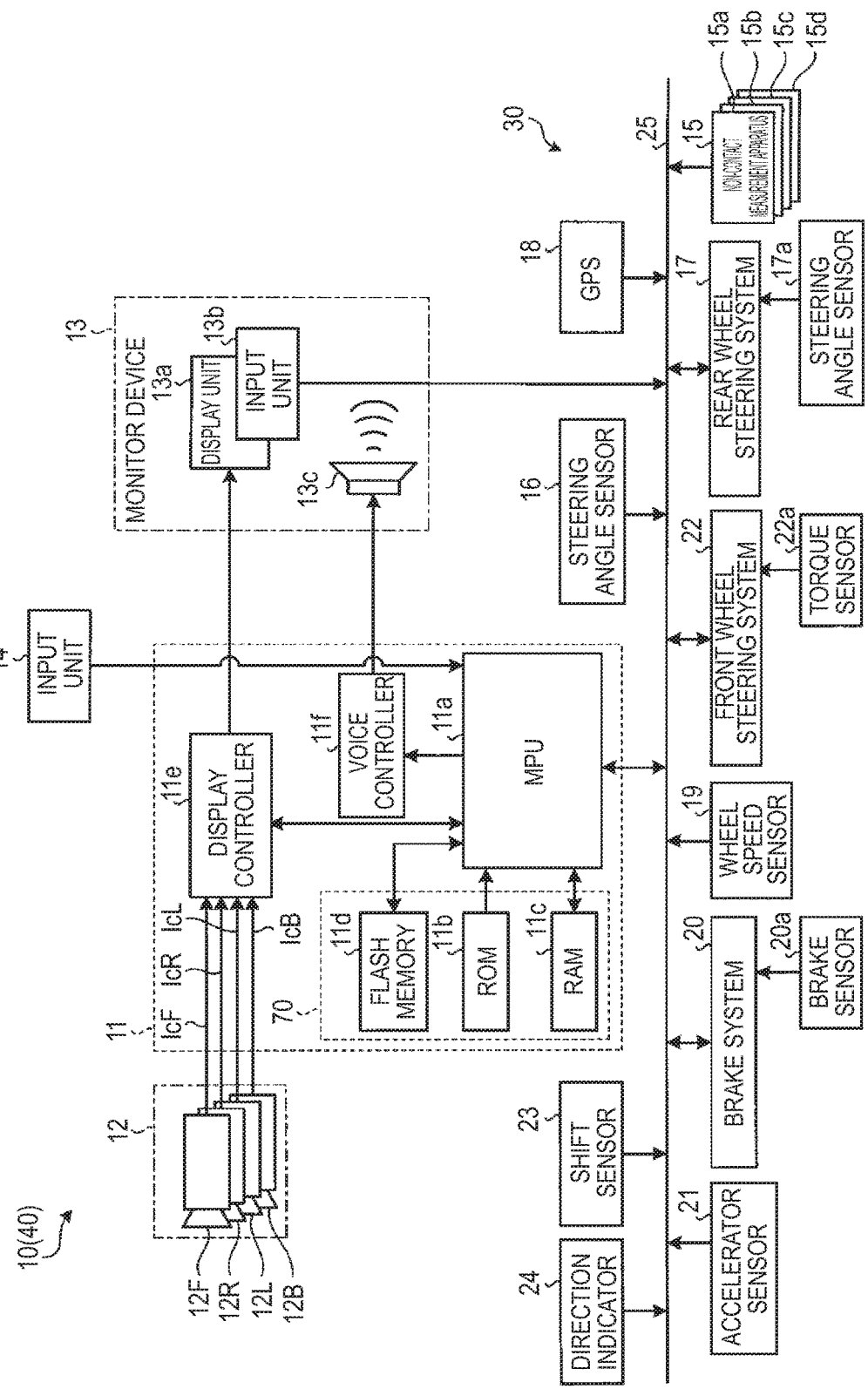
FIG. 1 is a block diagram illustrating a schematic configuration of an in-vehicle system mounted in a vehicle.

FIG. 1 is a schematic configuration block diagram of an in-vehicle system mounted in a vehicle.

Generally, an in-vehicle system 10 includes an ECU 11 that serves as an image processing system for a vehicle and controls the entire in-vehicle system 10, an imaging device 12 that captures an image of a portion around the vehicle on which the in-vehicle system 10 is mounted, a monitor device 13 that displays various types of monitoring screens, an input unit 14 that performs various types of operation inputs, and a vehicle control system 30 that controls the vehicle under the control of the ECU 11.

In the above-described configuration, as illustrated in FIG. 1, the ECU 11 has a micro processing unit (MPU) 11a that controls the entire ECU 11 and performs various types of calculations, a read only memory (ROM) 11b that stores a control program and various types of data in a non-volatile manner, a random access memory (RAM) 11c that temporarily stores data under processing, a flash memory 11d that stores various types of data in a non-volatile manner such that the data are updatable, and maintains the data even though a power source of the ECU 11 is turned off, a display controller 11e that controls various types of displays to perform a general image processing on input image data, a general image processing on image data to be displayed on the monitor device 13, and so on, and a voice controller 11f that controls various types of voices to execute a processing of voice data output from the monitor device 13.

In the example in FIG. 1, the imaging device 12 is provided with four imaging units 12F, 12R, 12L, and 12B, each of which is configured as a digital camera that incorporates imaging elements such as a charge coupled device (CCD) and a CMOS image sensor (CIS).

Figure 2:
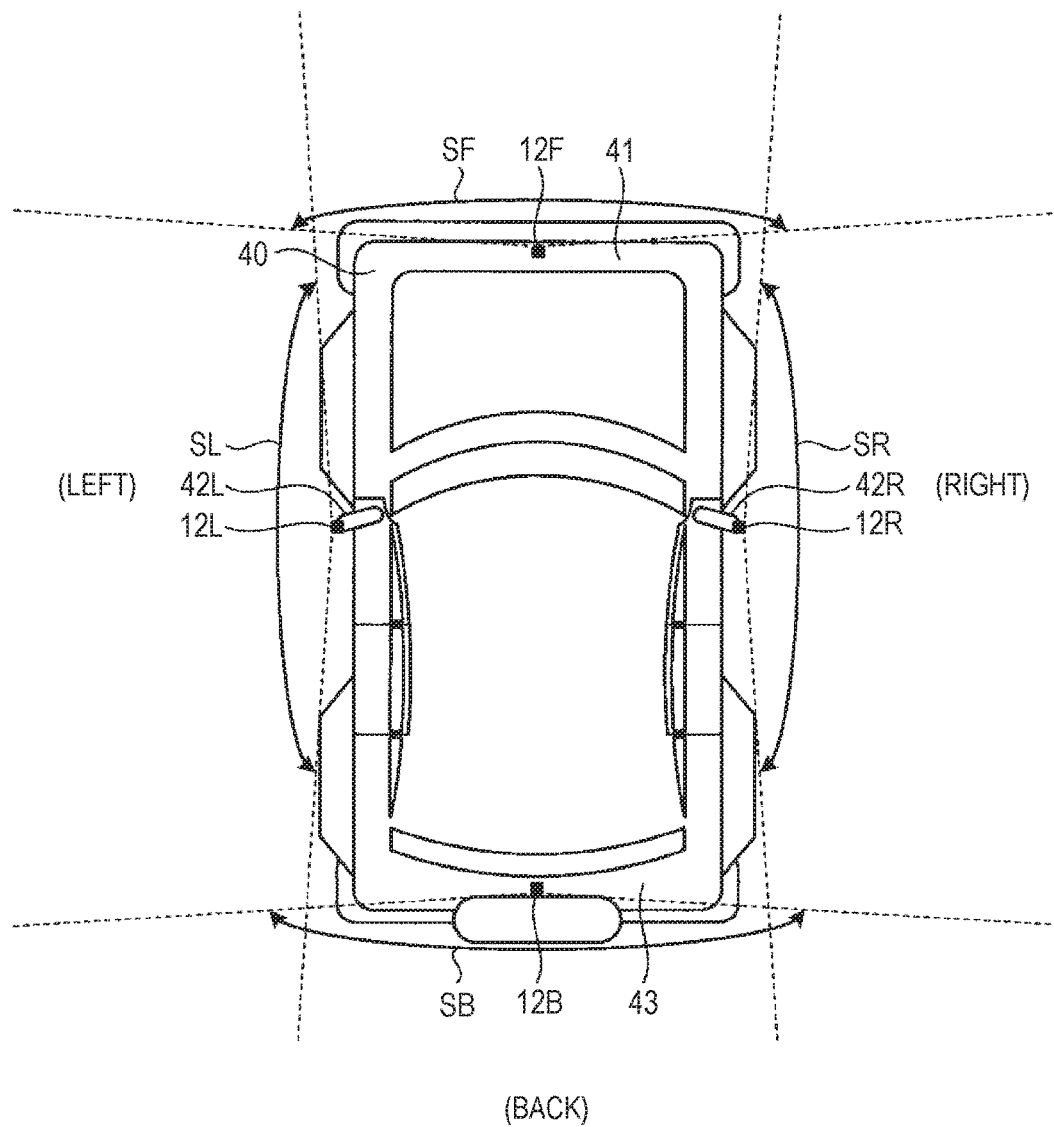
FIG. 2 is an explanatory view illustrating an arrangement example of imaging units that constitute an imaging device.

FIG. 2 is an explanatory view illustrating an arrangement example of the imaging units that constitute the imaging device.

As illustrated in FIG. 2, the imaging unit 12F of the imaging device 12 is disposed on a front grill 41 at the front side of a vehicle 40 to capture an image of the front side of the vehicle 40 (an image capturing range SF) and output captured image data to the ECU 11. In addition, the imaging unit 12R is accommodated in the right side mirror (door mirror) 42R of the vehicle to capture an image of the right side of the vehicle 40 (an image capturing range SR) and output captured image data to the ECU 11. In addition, the imaging unit 12L is accommodated in the left side mirror (door mirror) 42L of the vehicle 40, captures an image of a left side of the vehicle 40 (an image capturing range SL), and outputs image capturing data to the ECU 11. Further, the imaging unit 12B is disposed on a rear hatch 43 or the like at the rear side of the vehicle 40 to capture an image of the rear side of the vehicle (an image capturing range SB) and output image capturing data to the ECU 11.

In this case, each of the imaging units 12F, 12R, 12L, and 12B is configured to be capable of outputting image data, i.e. video data at a predetermined frame rate.

In the above-described configuration, for example, each of the imaging units 12F, 12R, 12L, and 12B is configured as a digital camera that is provided with a wide-angle lens or a fisheye lens. The imaging device 12 acquires captured surrounding image data of the vehicle 40.

In the present exemplary embodiment, the imaging device 12 is provided with the four imaging units 12F, 12R, 12L, and 12B. However, the number of imaging units may be three or less, or five or more as necessary. In addition, the image capturing ranges SF, SR, SL, and SB of the plurality of imaging units 12F, 12R, 12L, and 12B need not be equal to one another, and may be different from each other as long as image capturing ranges required for the imaging device 12 are ensured.

The monitor device 13 includes a display unit 13a configured as a liquid crystal display (LCD), an input unit 13b configured as a touch panel, and a voice output device 13c having an amplifier (amplification circuit) and a speaker.

In the present exemplary embodiment, the transparent input unit 13b is disposed to cover a display screen of the display unit 13a, and the display unit 13a, and the input unit 13b entirely constitute a touch panel display.

Therefore, a user may perform the input by touching, pushing, or moving (tapping, flicking, and swiping) the input unit 13b with a finger or the like at a position corresponding to an image displayed on the display screen of the display unit 13a.

For example, the display unit 13a, the input unit 13b, the voice output device 13c, and the like are provided on the monitor device 13 positioned at a central portion of a dashboard in a vehicle width direction, that is, a left and right direction. For example, the monitor device 13 may be provided with an operation input unit (not illustrated) such as a switch, a dial, a joystick, or a push button.

The monitor device 13 is also used as a navigation system or an audio system.

For example, the vehicle control system 30 has an in-vehicle network 25 according to a controller area network (CAN) standard, and the vehicle control system 30 is connected to the ECU 11 through the in-vehicle network 25.

The vehicle control system 30 includes a non-contact measurement apparatus 15 including plural non-contact measuring units 15a to 15d, each of which is configured as a gyro sensor, an acceleration sensor, or a sonar or a radar, a steering angle sensor 16 that detects a steering angle of a steering wheel, a rear wheel steering system 17 that is connected to a steering angle sensor 17a for detecting a steering angle of a rear wheel and performs a steering control on the rear wheel, a GPS 18 that receives positioning radio waves from a GPS satellite and outputs information about a latitude, a longitude, a height, and the like, a wheel speed sensor 19 that detects a rotation amount of the wheel or a rotational speed of the wheel per unit time, a brake system 20 which is connected to a brake sensor 20a and performs a brake control, an accelerator sensor 21 that detects a step-in condition of an accelerator pedal (accelerator pedal operation amount), a front wheel steering system 22 that is connected to a torque sensor 22a for detecting front wheel torque and performs steering control on a front wheel, a shift sensor 23 that detects a shift switching state, and a direction indicator 24 that controls a direction indicating lamp.

As described above, the non-contact measurement apparatus 15 includes the plurality of non-contact measuring units 15a to 15d, each of which is configured as a gyro sensor, an acceleration sensor (e.g., a 3-axis acceleration sensor), or a sonar or a radar, which emits ultrasonic waves or radio waves and captures reflective waves, and the ECU 11 measures the azimuth of the vehicle 40, the acceleration of the vehicle 40, the inclination of the vehicle 40, the presence or absence of an obstacle positioned around the vehicle 40, and a distance to the obstacle based on the detection result of the non-contact measurement apparatus 15. That is, the non-contact measurement apparatus 15 implements an azimuth detection function, an acceleration detection function, an inclination detection function, an object detection function, a distance measurement function, and the like.

As described above, the steering angle sensor 16 is a sensor that detects a steering amount of the steering wheel, and is configured using, for example, a hall element or the like. Here, the steering amount of the steering wheel is detected as, for example, a rotation angle.

The rear wheel steering system 17 steers the rear wheel in accordance with an output from the steering angle sensor 17a.

Here, as described above, the steering angle sensor 17a is a sensor that detects the steering amount of the rear wheel, and is configured using, for example, the steering angle sensor 17a is configured using, for example, a hall element or the like. Here, the steering amount of the rear wheel is detected as, for example, a rotation angle and output to the rear wheel steering system 17.

Based on positioning radio waves received from the GPS satellite, the GPS 18 may acquire a current position of the vehicle 40 such as a latitude, a longitude, and a height, a traveling direction, a traveling velocity, an angular velocity, and the like.

As described above, the wheel speed sensor 19 is a sensor that detects a rotation amount of the wheel or a rotational speed of the wheel per unit time, and is configured using, for example, a hall element or the like. The ECU 11 may calculate a movement amount of the vehicle 40 or the like based on data acquired by the wheel speed sensor 19. Further, there is also a case in which the wheel speed sensor 19 is provided in the brake system 20.

The brake system 20 serves as an anti-lock brake system (ABS) that inhibits a lock of a brake, an electronic stability control (ESC) device that inhibits a sideslip of the vehicle 40 at the time of cornering, a brake by wire (BBW) system that increases braking force, and the like. The brake system 20 provides a braking force to the wheel through an actuator (not illustrated), thereby decelerating the vehicle 40. For example, the brake sensor 20a is a sensor that detects an operation amount of a brake pedal (not illustrated).

For example, the accelerator sensor 21 is a sensor that detects an operation amount of an accelerator pedal (not illustrated).

The torque sensor 22a detects torque applied to a steering part including the steering wheel by a driver.

The front wheel steering system 22 steers the front wheels in accordance with an output of the torque sensor 22a and an operation amount of the steering wheel.

For example, the shift sensor 23 is a sensor that detects positions of moving parts of a gear shifting unit, and is configured using a displacement sensor or the like. Here, the moving parts of the gear shifting unit may include, for example, a lever, an arm, a button, and the like.

The direction indicator 24 outputs signals for instructing a direction indicating light to be turned on and off and to flicker.

In the aforementioned description, the ECU 11 separately include the MPU 11a, the ROM 11b, the RAM 11c, and the like. However, the MPU 11a, the ROM 11b, the RAM 11c, and the like may be integrated in the same package.

In addition, the ECU 11 may be configured using other logical operation processors such as a digital signal processor (DSP), a logic circuit, or the like, instead of the MPU 11a.

In the aforementioned description, the ECU 11 is described as being configured to have the flash memory 11d, but a solid state drive (SSD) or a hard disk drive (HDD) may be provided instead of the flash memory 11d.

The flash memory 11d, the SSD, or the HDD may be provided separately from the ECU The ECU 11 controls the display unit 13a in order to display an output image. The ECU 11 is an example of an image processing system or a display controller.

Figure 3:
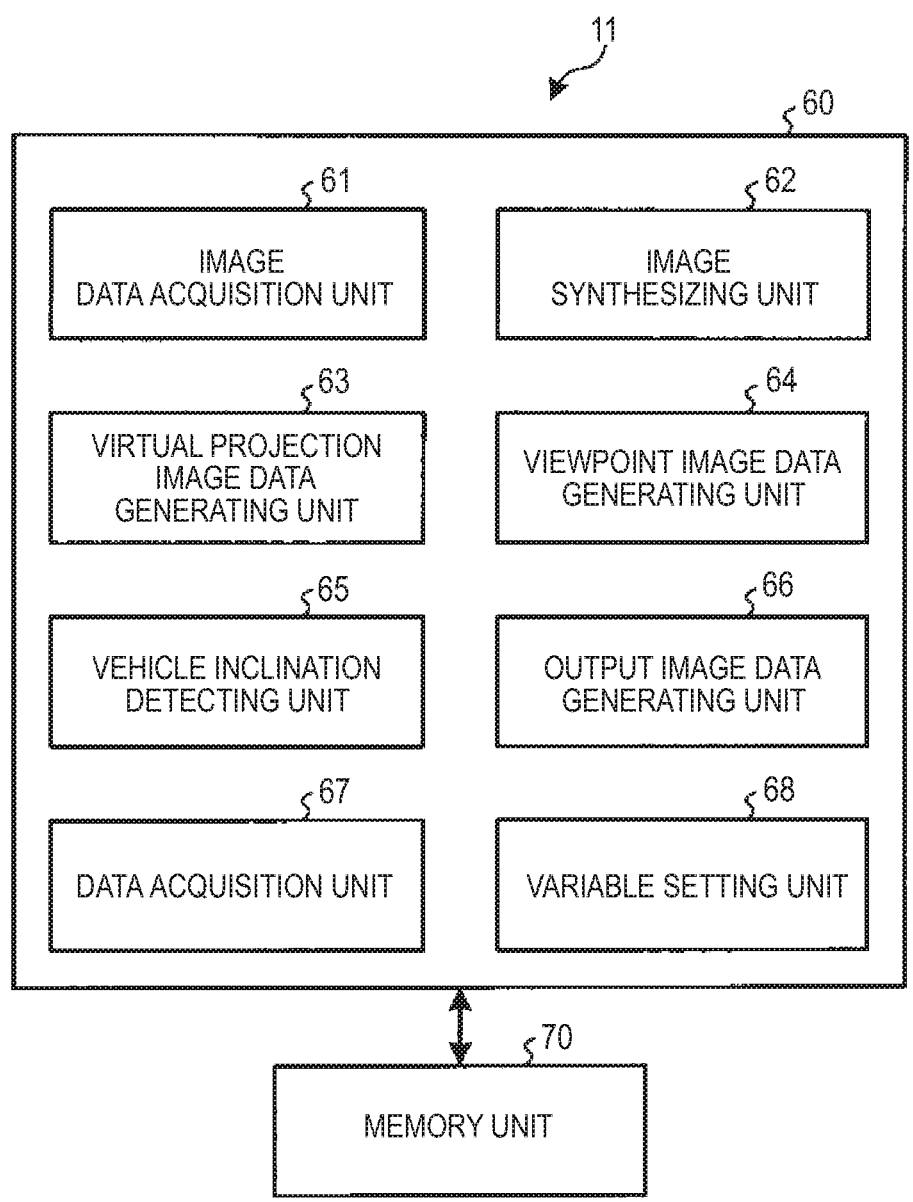
FIG. 3 is a functional block diagram of an ECU.

FIG. 3 is a functional block diagram of the ECU.

The ECU 11 serves as an image processing system for a vehicle in cooperation with hardware or software (program).

Generally, the ECU 11 serves as an image processing unit 60 and a storage unit 70.

For example, the image processing unit 60 is mainly implemented by the MPU 11a, and the MPU 11a serves as respective parts of the image processing unit 60, that is, an image data acquisition unit 61, an image synthesizing unit 62, a virtual projection image data generating unit 63, a viewpoint image data generating unit 64, a vehicle inclination detecting unit 65, an output image data generating unit 66, a data acquisition unit 67, a variable setting unit 68, and the like.

In this case, at least a part of image processing, which is performed by the image processing unit 60, may be performed by the display controller 11e. In addition, the respective parts of the image processing unit 60 may be configured as a module of a program, and at least some of the respective parts of the image processing unit 60 may be configured as hardware.

In the configuration, for example, the data acquisition unit 67 acquires data input by the input units 13b and 14 or data of detection results of the sensor and the like in addition to data regarding the captured image.

For example, the variable setting unit 68 may use a virtual projection plane Sp which makes it easy to obtain a display form of an output image, which is more advantageous to a situation of the vehicle, in order to change the virtual projection plane Sp in accordance with the situation of the vehicle. Here, for example, the situation of the vehicle may include a velocity of the vehicle, an inclination of the vehicle, a distance between the vehicle and an object at the periphery of the vehicle, and the like.

The virtual projection plane may be changed in accordance with a situation of the vehicle. Therefore, for example, it is easy to obtain a display form of an output image which is more advantageous to a situation of the vehicle. For example, the situation of the vehicle includes a velocity of the vehicle, an inclination of the vehicle, a distance between the vehicle and an object at the periphery of the vehicle, and the like.

Meanwhile, the storage unit 70 is realized by the ROM 11b, the RAM 11c, and the flash memory 11d.

Next, an operation of the ECU 11, which serves as the image processing unit 60 and the storage unit 70, will be described.

Figure 4:
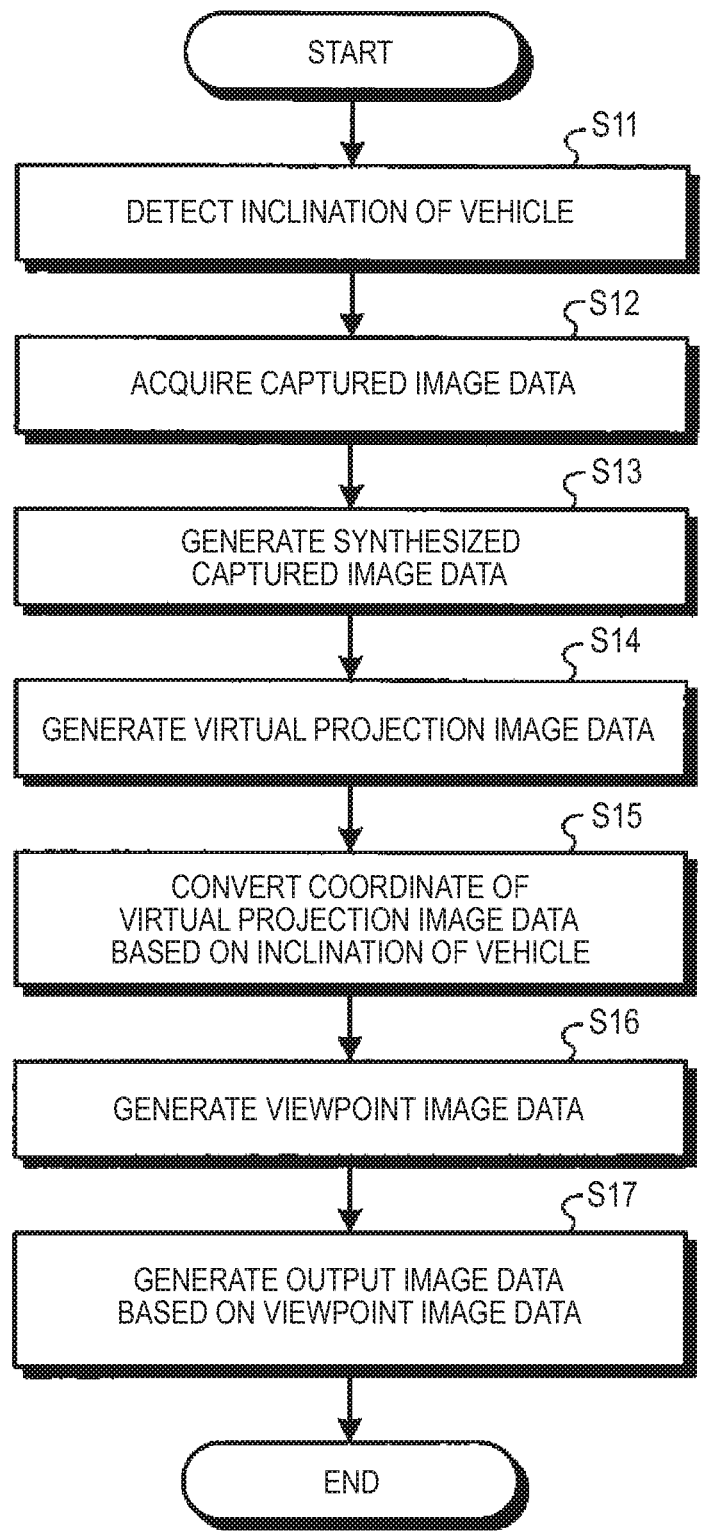
FIG. 4 is an operation processing flowchart of an ECU of a first exemplary embodiment.

FIG. 4 is an operation processing flowchart of the ECU of a first exemplary embodiment.

First, the ECU 11, which serves as the vehicle inclination detecting unit 65, detects an inclination of the vehicle 40 based on a measurement result of the non-contact measurement apparatus 15 (step S11).

Specifically, the ECU 11 detects inclinations in a front and rear direction, a left and right direction, or an up and down direction of the vehicle 40 by using an azimuth detection function or an acceleration detection function, for example, by using the gyro sensor or the acceleration sensor among the plurality of non-contact measuring units 15a to 15d that constitutes the non-contact measurement apparatus 15.

Next, the image data acquisition unit 61 acquires plural pieces of captured image data corresponding to plural captured images captured by the plural imaging units 12F, 12R, 12L, and 12B (step S12).

Next, the ECU 11, which serves as the image synthesizing unit 62, synthesizes and connects boundary portions between the plurality of images corresponding to the plurality of captured image data acquired by the image data acquisition unit 61, that is, the plurality of captured images captured by the plurality of imaging units 12F, 12R, 12L, and 12B such that there is no breakdown if possible, thereby generating synthesized captured image data which are data of a single captured image (step S13).

The ECU 11, which serves as the virtual projection image data generating unit 63, generates virtual projection image data obtained when it is assumed that the synthesized captured image data are projected on the virtual projection plane Sp to be described below (see FIG. 5) which surrounds the periphery of the vehicle 40 (step S14).

FIG. 5 illustrates explanatory views of the virtual projection plane.

(a) in FIG. 5 is a top plan view of the virtual projection plane Sp, (b) in FIG. 5 is a side view of the virtual projection plane Sp, and (c) in FIG. 5 is a cross-sectional view of the virtual projection plane Sp taken along line A-A.

In an example in FIG. 5, the virtual projection plane Sp has a bottom surface Spg which is parallel to a horizontal surface Gr, and a side surface Sps which stands up from the bottom surface Spg, that is, the horizontal surface Gr.

In the first exemplary embodiment, the virtual projection plane Sp is set integrally with the vehicle 40, and the bottom surface Spg is a flat surface included in the horizontal surface Gr in an ideal case in which the vehicle 40 is not inclined in any direction among the front and rear direction, the left and right direction, and the up and down direction. In other words, in the first exemplary embodiment, a disposition position of the virtual projection plane Sp is changed in accordance with an inclination of the vehicle 40 as described below in detail.

The bottom surface Spg is a flat surface having an approximately circular shape, and the side surface Sps is a curved surface that abuts a circumference of the bottom surface Spg.

Figure 6:
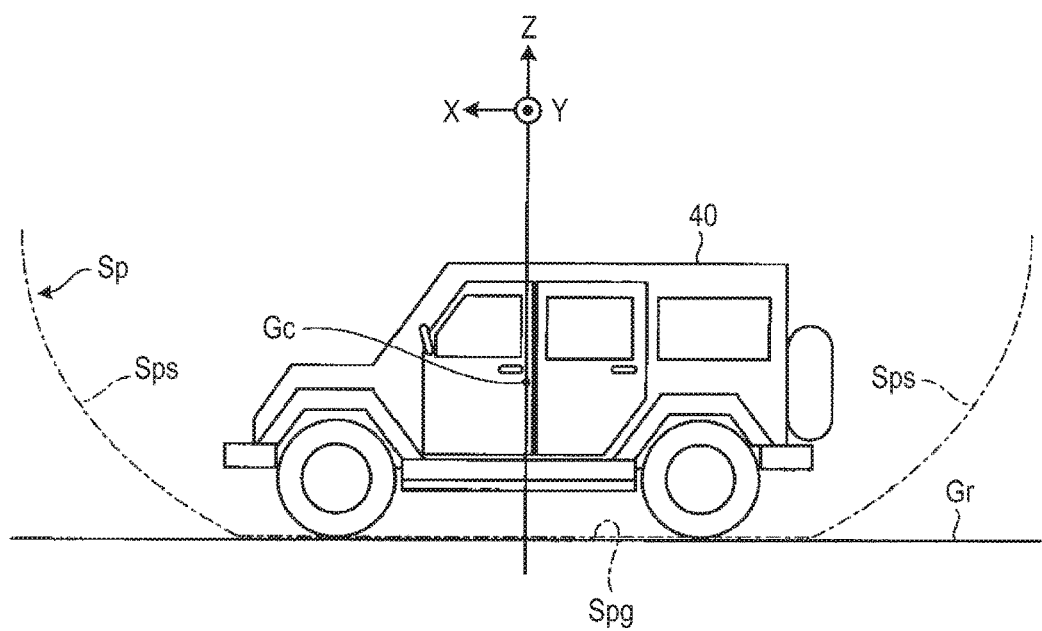
FIG. 6 is an explanatory view illustrating an arrangement position of the virtual projection plane with respect to a vehicle.

FIG. 6 is an explanatory view illustrating an arrangement position of the virtual projection plane with respect to a vehicle.

In this case, when it is assumed that a Z axis runs through the center Gc of the vehicle 40, a shape of a cross section of the side surface Sps, which intersects a plane including the Z axis, has, for example, an elliptical circumferential shape or a parabolic shape, as illustrated in FIG. 6. Here, the side surface Sps surrounds the vehicle 40 along the circumference of the bottom surface Spg.

Figure 7:
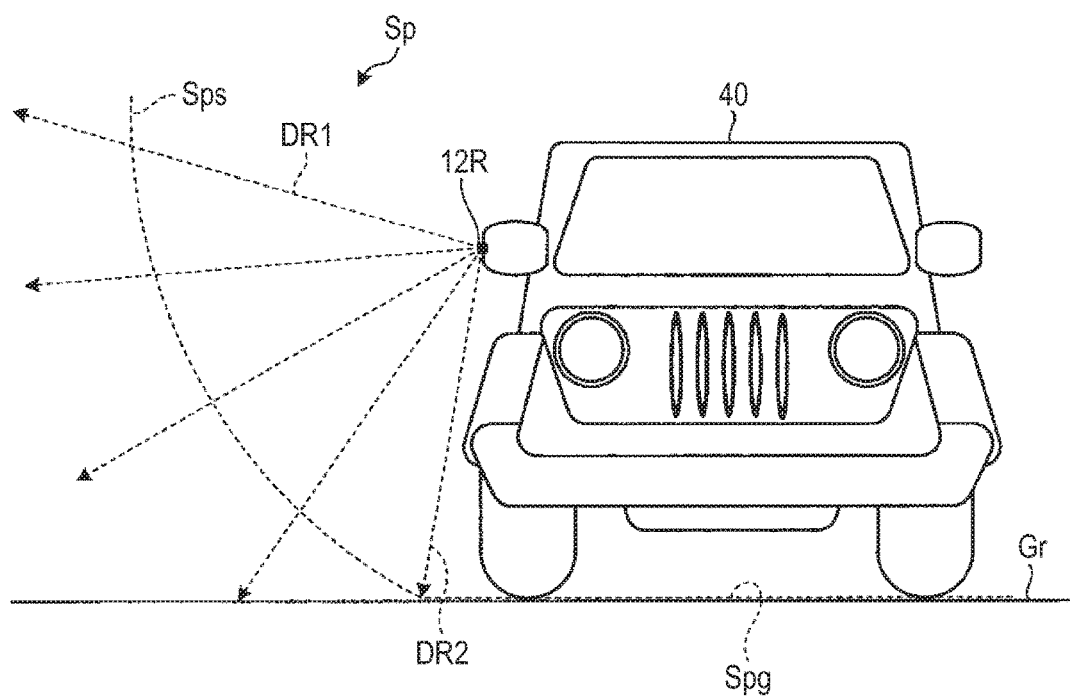
FIG. 7 is a view for explaining a relationship between an imaging range of an imaging unit and the virtual projection plane.

FIG. 7 is a view for explaining a relationship between an image capturing range of an imaging unit and the virtual projection plane.

In FIG. 7, for a brief description, the imaging unit 12R will be described as an example.

It is assumed that for example, as illustrated in FIG. 7, an image capturing range of the imaging unit 12R is between directions DR1 and DR2 in the up and down direction, and an image corresponding to the range between the directions DR1 and DR2 is projected on the virtual projection plane Sp.

In addition, the virtual projection image data generating unit 63 calculates virtual projection image data Ip corresponding to a virtual projection image GSp to be obtained when it is assumed that images GIcF, GIcR, GIcL, and GIcB correspond to captured image data IcF, IcR, IcL, and IcB (see FIG. 1) output by the imaging units 12F, 12R, 12L, and 12B are projected on the virtual projection plane Sp. That is, virtual projection image data Ip is obtained by performing coordinate conversion of pixels that constitute the images corresponding to the captured image data IcF, IcR, IcL, and IcB.

In this case, as illustrated in FIG. 2, overlapped portions are present in the four images GIcF, GIcR, GIcL, and GIcB corresponding to the captured image data IcF, IcR, IcL, and IcB obtained by the four imaging units 12F, 12R, 12L, and 12B, and as a result, the virtual projection image data generating unit 63 synthesizes the images such that image distortion is reduced in the overlapped portions as much as possible, thereby obtaining the virtual projection image data Ip.

Figure 8:
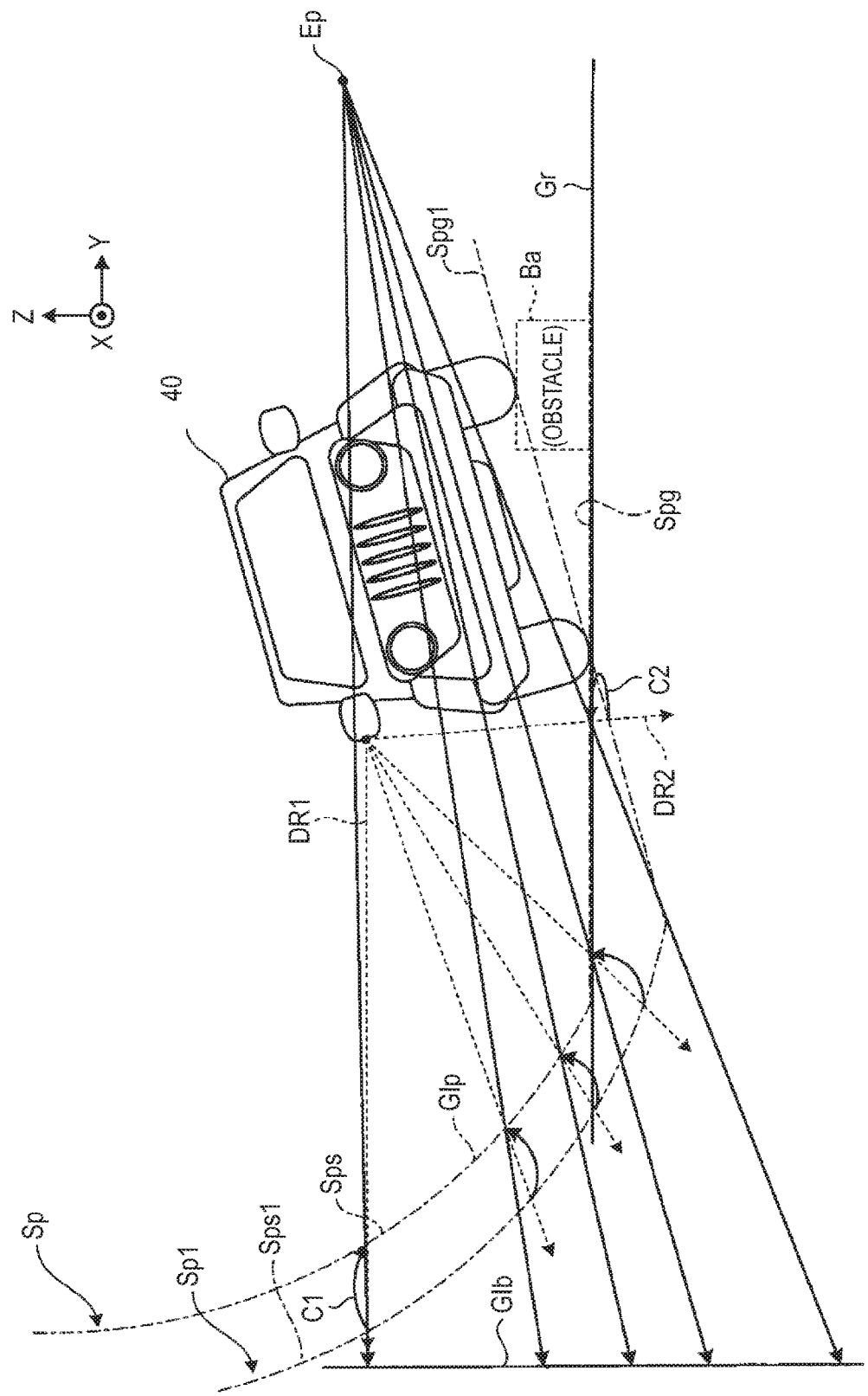
FIG. 8 is a view for explaining a relationship between a fixed virtual projection plane and a viewpoint image in a case in which the vehicle is inclined.

FIG. 8 is a view for explaining a relationship between the fixed virtual projection plane and a viewpoint image in a case in which the vehicle is inclined.

By the way, in the case in which the vehicle 40 is inclined, the virtual projection plane Sp is also inclined to be in the state of a virtual projection plane Sp1 as illustrated in FIG. 8. In the case in which the inclined virtual projection plane Sp1 is handled in its present state, an image of the periphery of the vehicle 40 in the state of being relatively inclined is projected on the virtual projection plane Sp1, and as a result, it becomes impossible to objectively see a state (posture) of the vehicle 40.

Therefore, in the first exemplary embodiment, coordinates of the virtual projection image data are converted based on the inclination of the vehicle (step S15).

That is, in the case in which the vehicle 40 is inclined due to an obstacle Ba such as a rock as illustrated in FIG. 8, the virtual projection plane Sp is also inclined together with the vehicle to be in the state of the virtual projection plane Sp1. Thus, the bottom surface Spg is made to be equal to the horizontal surface Gr by practically inclining the virtual projection plane Sp1 in a direction in which the inclination of the vehicle 40 is canceled out, by performing the coordinate conversion.

More specifically, for example, a coordinate on the virtual projection plane Sp1 corresponding to the direction DR1 is converted into a coordinate on the virtual projection plane Sp by coordinate conversion C1, and a coordinate on the virtual projection plane Sp1 corresponding to the direction DR2 is converted into a coordinate on the virtual projection plane Sp by coordinate conversion C2.

As a result, the bottom surface Spg of the virtual projection plane Sp becomes equal to the horizontal surface Gr even though the vehicle 40 is inclined, so that a virtual projection image GIp can be obtained based on the horizontal surface Gr.

Next, the viewpoint image data generating unit 64 generates viewpoint image data Ib corresponding to a viewpoint image GIb viewed from a predetermined virtual viewpoint Ep by using the virtual projection image GIp projected on the virtual projection plane Sp based on the virtual projection image data Ip (step S16).

In this case, based on the inclination amount of the vehicle which is acquired by the vehicle inclination detecting unit 65 in step S11, the viewpoint image data generating unit 64 converts the virtual projection image GIp projected on the virtual projection plane Sp into the viewpoint image data Ib corresponding to the viewpoint image GIb viewed from the predetermined virtual viewpoint Ep, as illustrated in FIG. 8. In this case, the virtual viewpoint Ep may be set arbitrarily by the user.

For example, in the example in FIG. 8, the virtual viewpoint Ep is set to a position appropriately spaced apart from the vehicle 40 in the left direction of the vehicle 40 and to a height of a center of a door of the vehicle 40. That is, it is possible to obtain a viewpoint image such as a viewpoint image obtained when a third party observes a traveling state of the vehicle 40 at a left side of the vehicle 40 outside the vehicle.

Subsequently, the output image data generating unit 66 generates output image data based on the viewpoint image data Ib (step S17).

Figure 9:
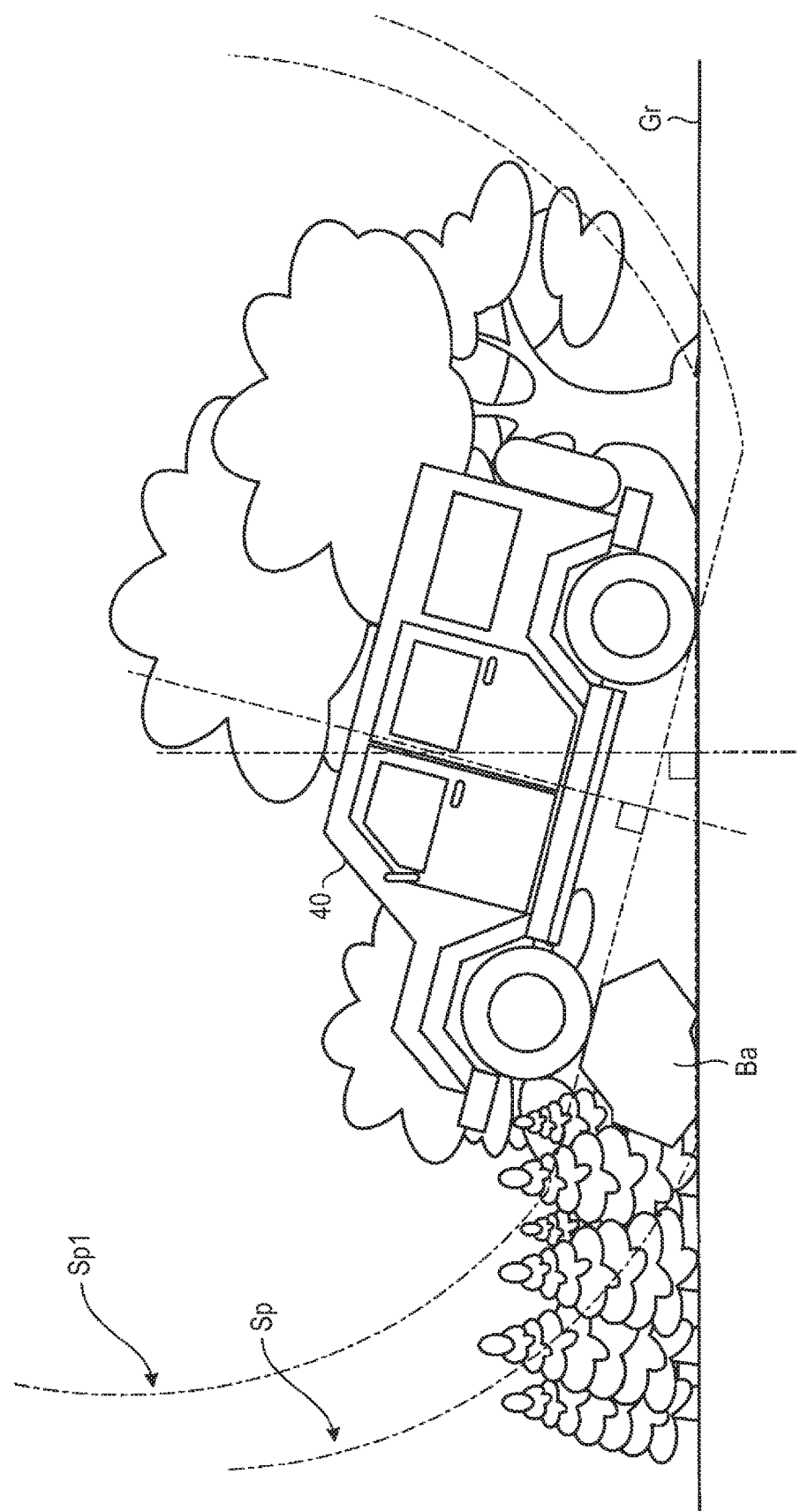
FIG. 9 is an explanatory view of an actual state of the vehicle which corresponds to an output image.

FIG. 9 is an explanatory view of an actual state of the vehicle which corresponds to an output image.

Figure 10:
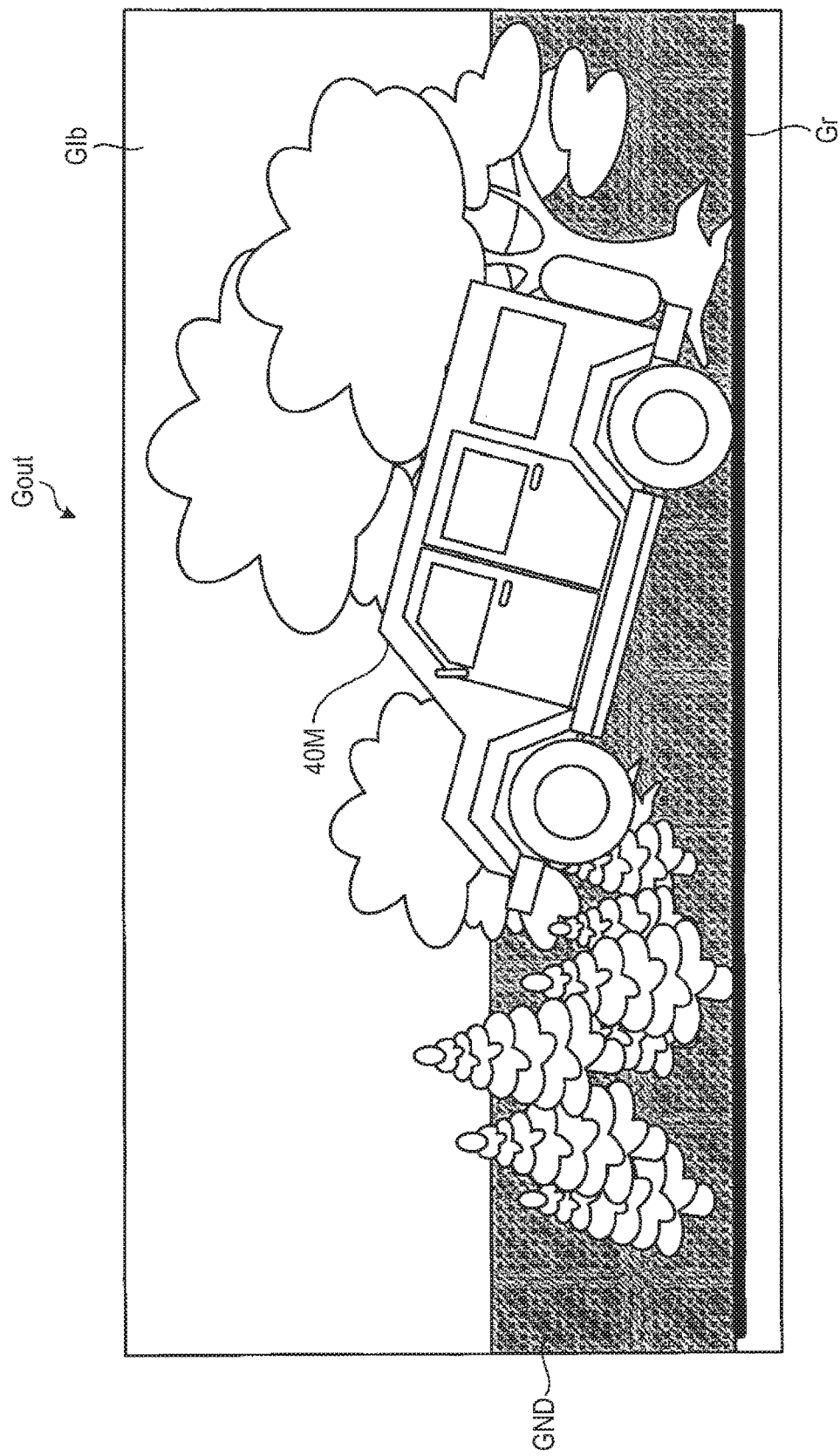
FIG. 10 is an explanatory view of an example of an output image.

FIG. 10 is an explanatory view of an example of an output image.

As illustrated in FIG. 9, in the case in which the front wheels of the vehicle 40 are placed on the obstacle Ba such as a rock, the virtual projection plane Sp1, which is set integrally with the vehicle 40, is in a state of being rotated with respect to the horizontal surface Gr together with the vehicle 40, but the virtual projection plane Sp actually required to generate the output image data is in a state in which the bottom surface Spg is included in the horizontal surface Gr.

As illustrated in FIG. 10, the viewpoint image GIb including trees, a ground surface GND and the like as a background image is displayed on an output image Gout, and a vehicle model image 40M for displaying a state (inclined state) of the vehicle 40 is displayed in a state of being inclined with respect to the horizontal surface Gr in front of the viewpoint image GIb which is the background image.

Therefore, according to the first exemplary embodiment, the output image Gout is obtained and displayed as illustrated in FIG. 10, and as a result, the user may intuitively recognize the inclination of the vehicle 40, which is the own vehicle, because the vehicle model image 40M of the vehicle 40, which is the own vehicle, is displayed, in a state of reflecting an actual inclination, on the background viewed in a state in which there is no inclination from the outside of the vehicle 40, and thereafter, the user may easily reflect the inclination of the vehicle 40 to a driving operation.

[2] Second Exemplary Embodiment

In the first exemplary embodiment, the virtual projection plane Sp is inclined integrally with the vehicle 40 when the vehicle 40 is inclined, but a second exemplary embodiment is an exemplary embodiment in which the virtual projection plane Sp is fixed (to the horizontal surface) without being affected by the inclination of the vehicle 40.

Figure 11:
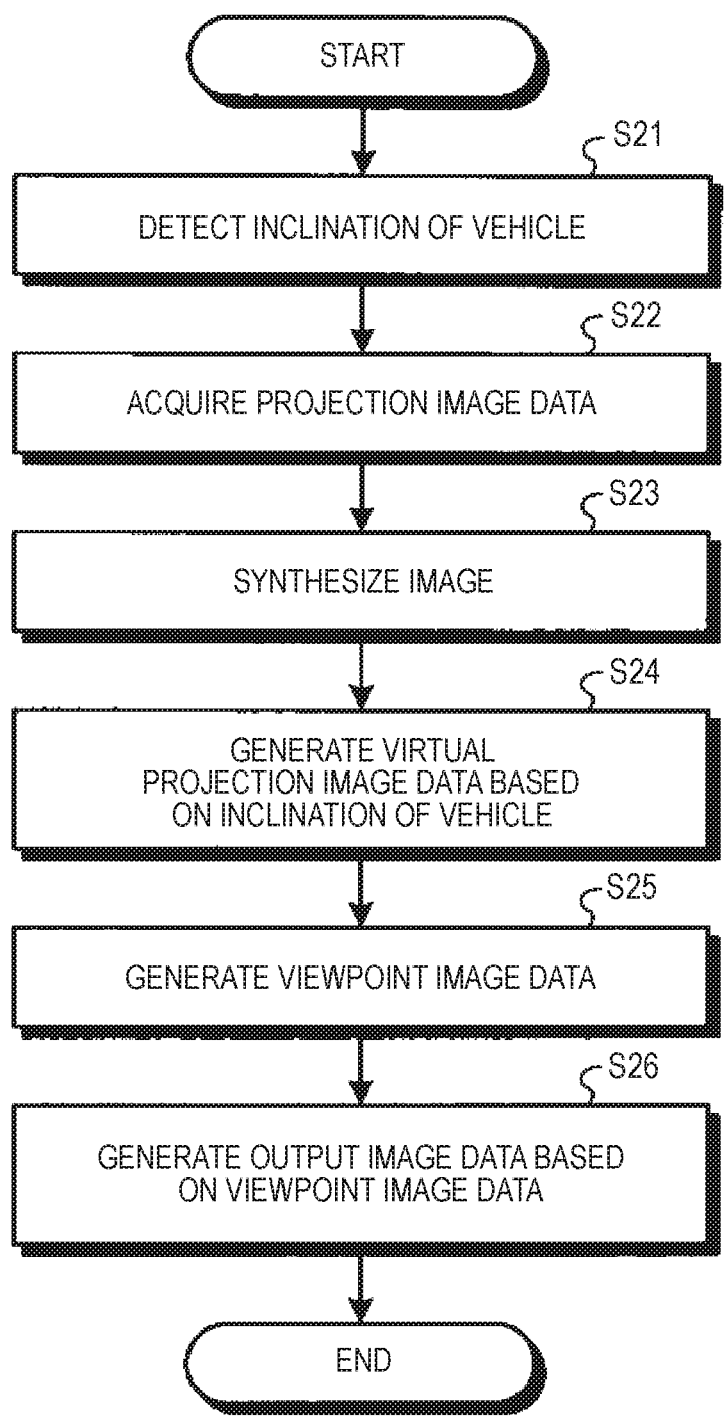
FIG. 11 is an operation processing flowchart of an ECU of a second exemplary embodiment.

FIG. 11 is an operation processing flowchart of the ECU of the second exemplary embodiment.

First, the ECU 11, which serves as the vehicle inclination detecting unit 65, detects an inclination of the vehicle 40 based on a measurement result of the non-contact measurement apparatus 15 (step S21).

Next, the ECU 11, which serves as the image data acquisition unit 61, acquires plural pieces of captured image data corresponding to plural captured images captured by the plural imaging units 12F, 12R, 12L, and 12B (step S22), and the ECU 11, which serves as the image synthesizing unit 62, synthesizes and connects boundary portions between the plural images corresponding to the plural pieces of captured image data acquired by the image data acquisition unit 31, that is, the plural captured images captured by the plural imaging units 12F, 12R, 12L, and 12B so that there is no breakdown if possible, thereby generating synthesized captured image data which are data regarding a single captured image (step S23).

The ECU 11, which serves as the virtual projection image data generating unit 63, generates virtual projection image data obtained when it is assumed that the synthesized captured image data are projected on the virtual projection plane which surrounds the vehicle 40 (step S24). In this case, the virtual projection image data generating unit 63 assumes that the synthesized captured image data are projected on the virtual projection plane, which surrounds the vehicle 40, in order to cancel the inclination amount of the vehicle 40 which is acquired by the vehicle inclination detecting unit 65 in step S21.

Next, the viewpoint image data generating unit 64 generates the viewpoint image data Ib corresponding to the viewpoint image GIb viewed from the predetermined virtual viewpoint Ep by using the virtual projection image GIp projected on the virtual projection plane Sp based on the virtual projection image data Ip in a state in which an inclination amount of the vehicle 40 is canceled (step S25).

Subsequently, similar to the case illustrated in FIG. 10, based on the viewpoint image data Ib, the output image data generating unit 66 generates output image data out corresponding to the output image Gout in which the viewpoint image GIb is displayed as a background image, and the vehicle model image 40M for displaying a state (inclined state) of the vehicle 40 is displayed in a state of being inclined with respect to the horizontal surface Gr in front of the viewpoint image GIb which is the background image.

Therefore, according to the second exemplary embodiment, the user may intuitively recognize the inclination of the vehicle 40, which is the own vehicle, based on the obtained output image Gout similar to the first exemplary embodiment, by canceling the inclination of the vehicle 40 when generating the virtual projection image data, and virtually assuming that the virtual projection image is projected on the virtual projection plane Sp fixed to the horizontal surface, and thereafter, the user may easily reflect the inclination of the vehicle 40 to a driving operation.

[3] Third Exemplary Embodiment

In the respective exemplary embodiments, the imaging units 12F, 12R, 12L, and 12B cannot capture a road surface (road or the like) facing the bottom surface of the vehicle 40. That is, it is impossible to obtain information about the road surface on which the vehicle 40 actually travels.

However, when the vehicle is in the state of traveling almost straight, an image of the road surface on which the vehicle currently travels should have been captured by the imaging unit 12F before a predetermined time.

Similarly, an image of the road surface on which the vehicle 40 currently travels should have been captured by the imaging unit 12R before a predetermined time in a case in which the vehicle 40 turns on a curve in a right direction, an image of the road surface on which the vehicle 40 currently travels should have been captured by the imaging unit 12L before a predetermined time in a case in which the vehicle 40 turns on a curve in a left direction, and an image of the road surface on which the vehicle 40 currently travels should have been captured by the imaging unit 12B before a predetermined time in a case in which the vehicle 40 moves backward.

Therefore, based on the past image capturing data about a captured image of the road surface on which the vehicle currently travels, the road surface on which the vehicle currently travels may be displayed.

Figure 12:
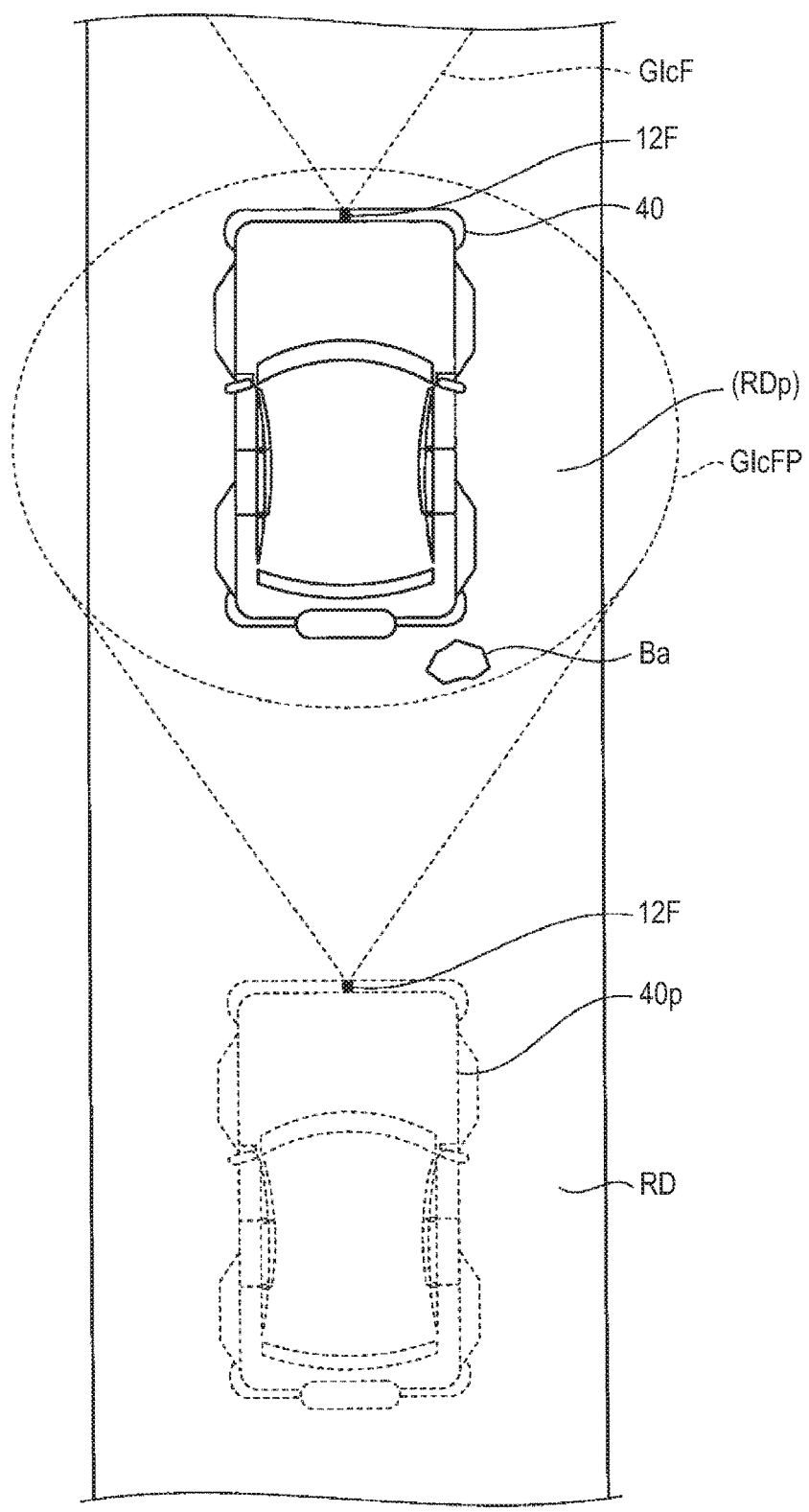
FIG. 12 is an explanatory view of a third exemplary embodiment.

FIG. 12 is an explanatory view of a third exemplary embodiment.

In FIG. 12, the vehicle 40 travels on a road surface (road) RD at a position illustrated at an upper side in FIG. 12, and a captured image captured by the imaging unit 12F at the position is an image GIcF.

In contrast, immediately before the vehicle 40 travels at the position illustrated at the upper side in FIG. 12, the vehicle 40 travels at a position of a vehicle 40P, and a captured image captured by the imaging unit 12F at the position is an image GIcFP including a road surface RDp.

The image GIcFP, which is obtained when the vehicle travels at the position of the vehicle 40P, is an image of the road surface, including the obstacle Ba, on which the vehicle 40 travels.

Therefore, in the third exemplary embodiment, an image captured at a place where the vehicle 40 currently travels is synthesized with the image GIcFP, which is obtained when the vehicle travels at the position of the vehicle 40P, as an image projected in a predetermined region including the bottom surface Spg of the virtual projection plane Sp, thereby displaying a current traveling state.

Figure 13:
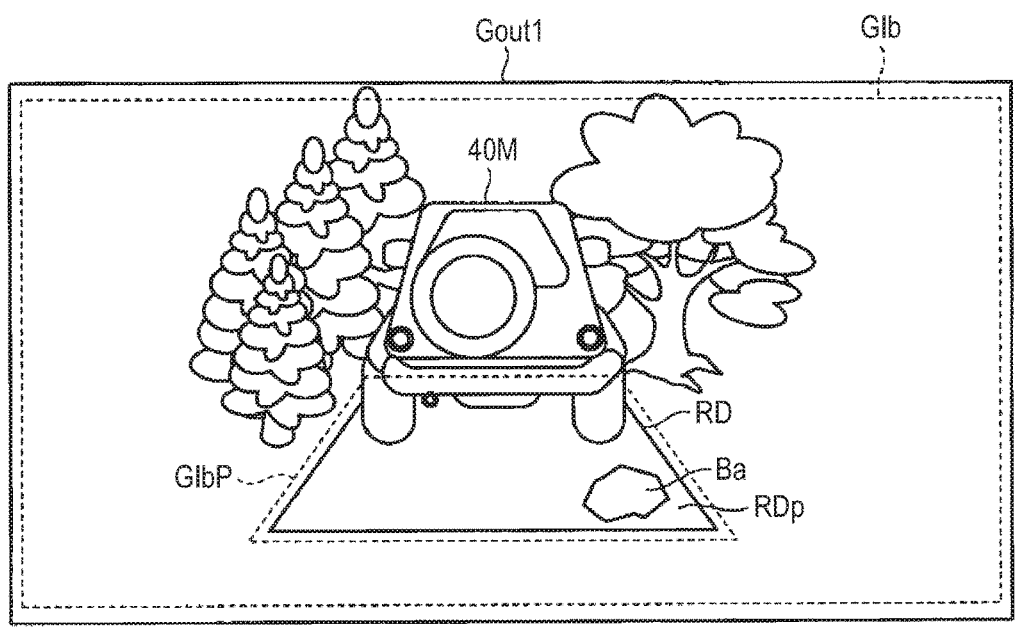
FIG. 13 is an explanatory view of an output image of the third exemplary embodiment.

FIG. 13 is an explanatory view of an output image of the third exemplary embodiment.

An output image Gout1 is an image in a case in which the virtual viewpoint Ep is set to the rear side of the vehicle 40. The viewpoint image GIb using the image GIcF which is obtained when the vehicle travels at the position of the vehicle 40 illustrated in FIG. 12 is used as the image in front of the vehicle 40, and the image for the road surface (road or the like) facing the bottom surface of the vehicle 40 is a viewpoint image GIbP using the image GIcFP which includes the road surface RDp and is obtained when the vehicle travels at the position of the vehicle 40P illustrated in FIG. 12.

As described above, according to the third exemplary embodiment, since it is possible to obtain an output image including a state of the road surface on which the vehicle currently travels, a state in which the vehicle 40 actually travels can be reliably recognized.

[4] Fourth Exemplary Embodiment

Figure 14A:
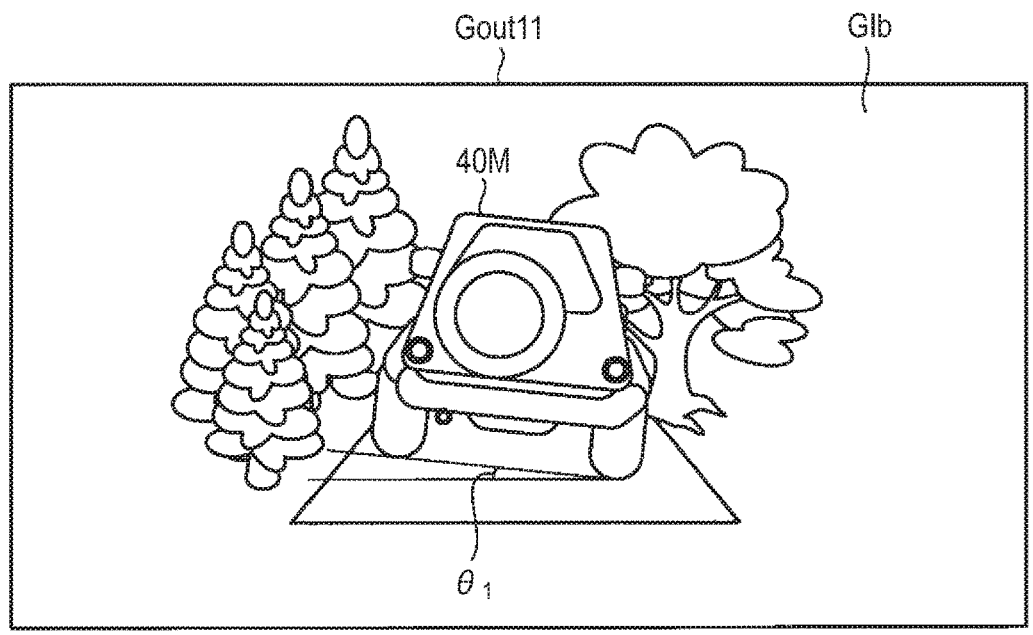
FIGS. 14A and 14B are explanatory views of a fourth exemplary embodiment.
Figure 14B:
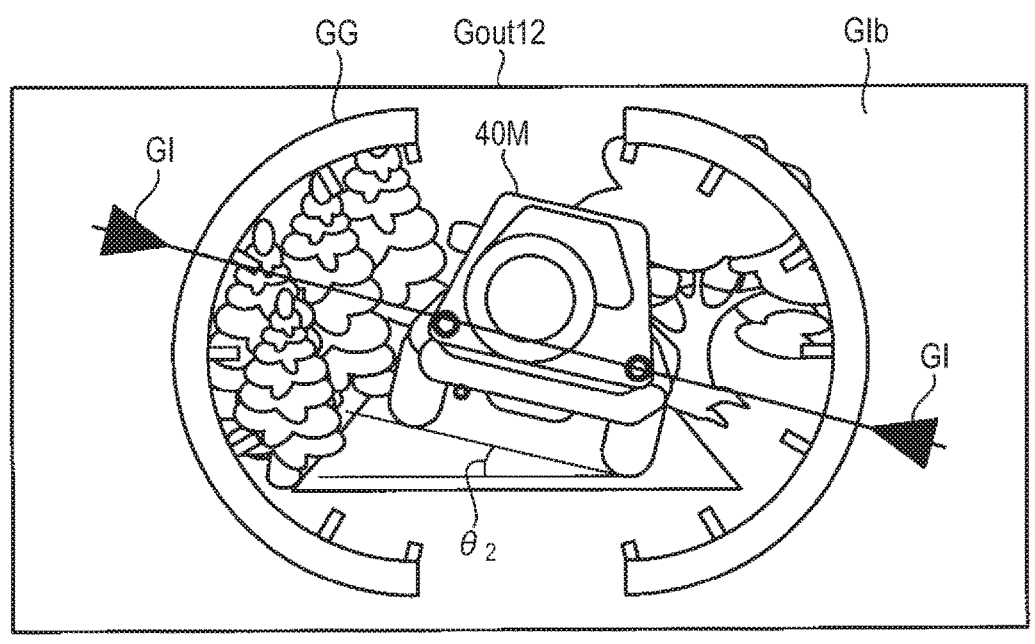

FIGS. 14A and 14B are explanatory views of a fourth exemplary embodiment.

FIG. 14A illustrates an output image Gout11 in a case in which the virtual viewpoint Ep is set to the rear side of the vehicle 40 when the vehicle 40 travels in a state in which the vehicle 40 is inclined at an angle $\theta_1$ in the left and right direction.

In this case, the angle $\theta_1$ is smaller than a predetermined threshold value angle $\theta_{th}$ ($\theta_1 < \theta_{th}$) at which it is assumed that the possibility of a sideslip, a skid, or the like of the vehicle is increased, and the output image Gout11 merely displays thereon the vehicle model image 40M, which is inclined at the angle $\theta_1$ on the viewpoint image GIb from the virtual viewpoint Ep at the rear side of the vehicle 40.

In contrast, FIG. 14B illustrates an output image Gout12 in a case in which the virtual viewpoint Ep is set to the rear side of the vehicle 40 when the vehicle 40 travels in a state in which the vehicle 40 is inclined at an angle $\theta_2$ ($>\theta_{th}$) in the left and right direction.

The vehicle model image 40M, which is inclined at the angle $\theta_2$ on the viewpoint image GIb from the virtual viewpoint Ep at the rear side of the vehicle 40, is displayed on the output image Gout12. Further, in the case in which the vehicle 40 is inclined at an angle larger than the threshold value angle $\theta_{th}$, a gauge image GG for calling a user's attention to an increase in the inclination of the vehicle 40 and more visually expressing the inclined state to the user and a gauge index GI for visually emphasizing and displaying the inclined state are displayed on the output image Gout12.

Therefore, according to the fourth exemplary embodiment, it is possible to provide information for objectively determining the inclined state of the vehicle 40.

In the example illustrated in FIGS. 14A and 14B, a numerical scale or the like of an inclination is not displayed on the gauge image GG. However, the gauge image may be configured to display the numerical scale, or to display the current inclination angle by a numerical value such as a pitch angle, a roll angle, and a yaw angle.

[5] Fifth Exemplary Embodiment

In the respective exemplary embodiments, the vehicle model image 40M is displayed to visually display an inclination of the vehicle 40, and a display mode is constant regardless of an inclined state of the vehicle 40.

Therefore, the inclined state of the vehicle may not be necessarily and intuitively recognized.

FIG. 15 is an explanatory view of a first display example of a fifth exemplary embodiment.

FIG. 15 illustrates a display example of the vehicle model image 40M in a case in which the virtual viewpoint Ep is set to the right side of the vehicle 40 in a state in which the vehicle travels on an uphill road.

In more detail, as illustrated in the left part in FIG. 15, in a case in which the inclination angle $\theta$ of the vehicle 40 is smaller than a first threshold value angle $\theta_{th1}$, the vehicle model image 40M is displayed with a white color that indicates a state in which, for example, the inclination angle $\theta$ is nearly horizontal.

As illustrated in a central part in FIG. 15, in a case in which the inclination angle $\theta$ of the vehicle 40 is larger than a first threshold value angle $\theta_{th1}$ and smaller than a second threshold value angle $\theta_{th2}$, the vehicle model image 40M indicates a state in which the vehicle is slightly inclined, and is displayed with an orange color in order to call the user's attention.

As illustrated in the right part in FIG. 15, in a case in which the inclination angle $\theta$ of the vehicle 40 is larger than the second threshold value angle $\theta_{th2}$ ($>\theta_{th1}$), the vehicle model image 40M indicates a state in which the inclination of the vehicle is significantly increased, and is displayed with a red color in order to call the user's attention.

FIG. 16 is an explanatory view of a second display example of the fifth exemplary embodiment.

FIG. 16 illustrates an display example of the vehicle model image 40M in a case in which the virtual viewpoint Ep is set to the front side of the vehicle 40 in a state in which the vehicle 40 travels on a road surface having a bank.

In more detail, as illustrated in the left part in FIG. 16, in a case in which the vehicle 40 travels in an almost horizontal state and the inclination angle $\theta$ in the left and right direction is smaller than a first threshold value angle $\theta_{th11}$, the vehicle model image 40M is displayed with a white color that indicates, for example, a state in which the inclination angle $\theta$ is nearly horizontal.

As illustrated in a central part in FIG. 16, in a case in which left and right inclination angles $\theta_1$ are larger than the first threshold value angle $\theta_{th11}$ and smaller than the second threshold value angle $\theta_{th12}$ in a state in which the wheels at one side, that is, the left wheels of the vehicle 40 travels on a bank, the vehicle model image 40M indicates a state in which the vehicle 40 is slightly inclined in the left and right direction, and is displayed with an orange color in order to call the user's attention.

As illustrated in the right part in FIG. 16, in a case in which the vehicle 40 completely travels on the bank and the inclination angle $\theta_1$ of the vehicle 40 in the left and right direction is larger the second threshold value angle $\theta_{th12}$ ($>\theta_{th11}$), the vehicle model image 40M indicates a state in which an inclination of the vehicle 40 is significantly increased, and is displayed with a red color in order to further call the user's attention.

In these cases, the displayed colors of the vehicle model image 40M may be appropriately set, and the user may set desired colors.

In addition to a change in color, for example, in a state in which the inclination of the vehicle is significantly increased, the display mode may be changed such that the vehicle model image 40M flickers or a flickering rate of the vehicle model image 40M is changed.

[6] Sixth Exemplary Embodiment

FIG. 17 is an explanatory view of a sixth exemplary embodiment.

The sixth exemplary embodiment is an exemplary embodiment in which in addition to a display of an inclination of the vehicle 40, a current relative altitude of the vehicle 40 from a predetermined reference altitude is displayed on an output image.

As illustrated in FIG. 17, in a case in which the reference altitude is set when the vehicle is present at an altitude of a vehicle 40R, the current relative altitude of the vehicle 40 is in a state illustrated in FIG. 17.

FIG. 18 is an explanatory view of an output image of the sixth exemplary embodiment.

The viewpoint image GIb is displayed as a background image on an output image Gout21, and the vehicle model image 40M for displaying a state (inclined state) of the vehicle 40 is displayed in a state of being inclined with respect to the horizontal surface Gr in front of the viewpoint image GIb which is the background image.

A relative altitude indicator AIND for visually displaying an actual relative altitude of the vehicle 40 is displayed on the left part of the output image Gout21, and a vehicle icon 401 is displayed at a position corresponding to the actual relative altitude of the vehicle 40.

Therefore, the user may visually and easily recognize the current relative altitude (e.g., a difference in uphill road altitude) of the own vehicle 40 with respect to the reference altitude.

[7] Seventh Exemplary Embodiment

Figure 19:
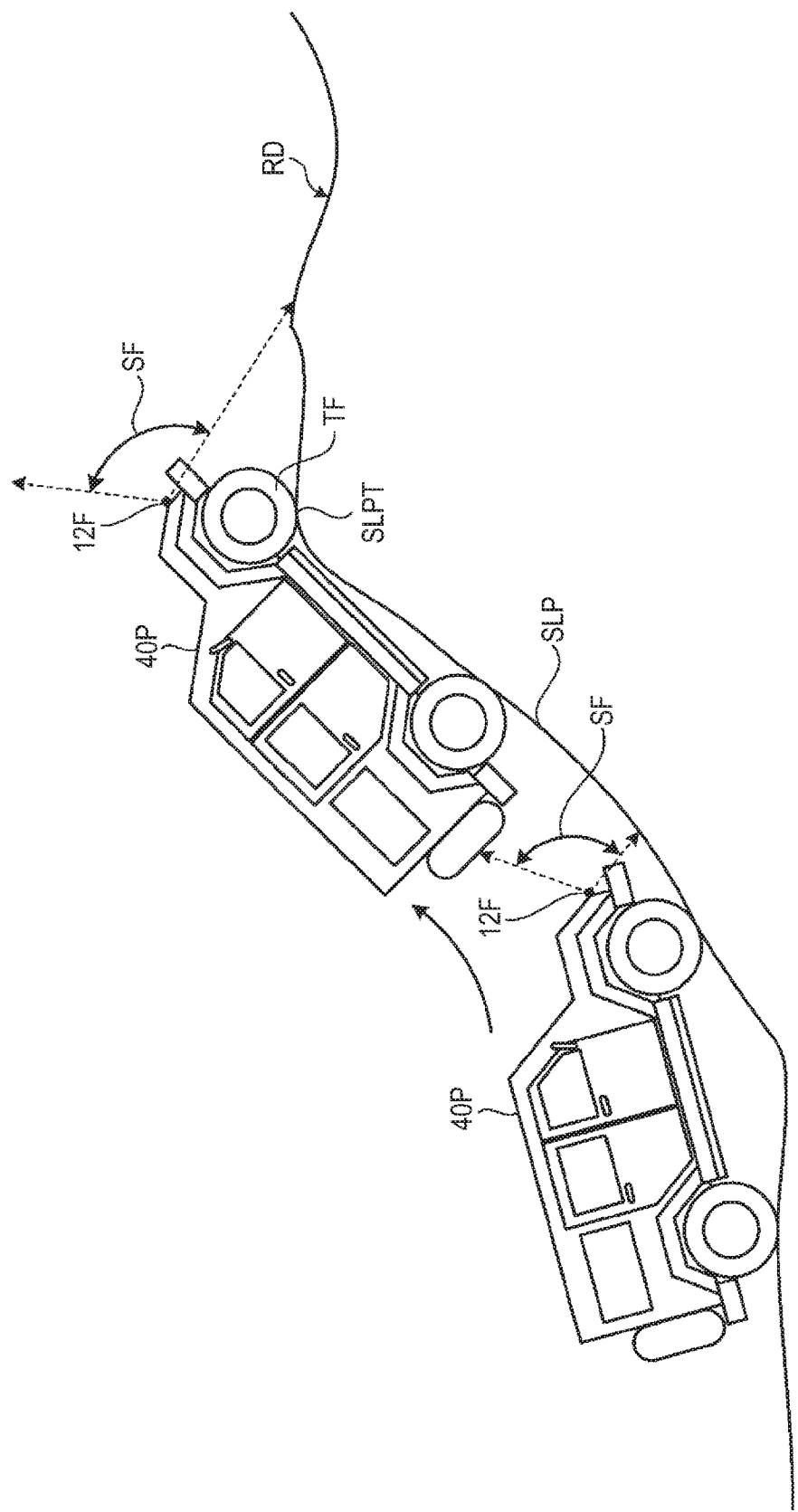
FIG. 19 is an explanatory view of a seventh exemplary embodiment.

FIG. 19 is an explanatory view of a seventh exemplary embodiment.

The seventh exemplary embodiment is an exemplary embodiment for informing the user of a state in which the vehicle 40, which was in a position indicated by a vehicle 40P and was about to ascend a slope SLP before a certain time, is in the state completely ascends the slope SLP such that the front wheels TF of the vehicle 40 reaches a top SLPT.

In general, in a case in which the front wheels TF reach the top SLPT in a state in which the vehicle 40 is ascending the slope SLP, it is possible to secure gripping force of the front wheels TF by stopping the vehicle 40 first, rather than causing the vehicle 40 to continuously ascend the slope SLP, so that it is assured that the ascent of the slope can be completed.

Therefore, the seventh exemplary embodiment informs the user of a state in which the ascent of the slope SLP is completed so that the front wheels TF of the vehicle 40 reach the top SLPT.

Figure 20A:
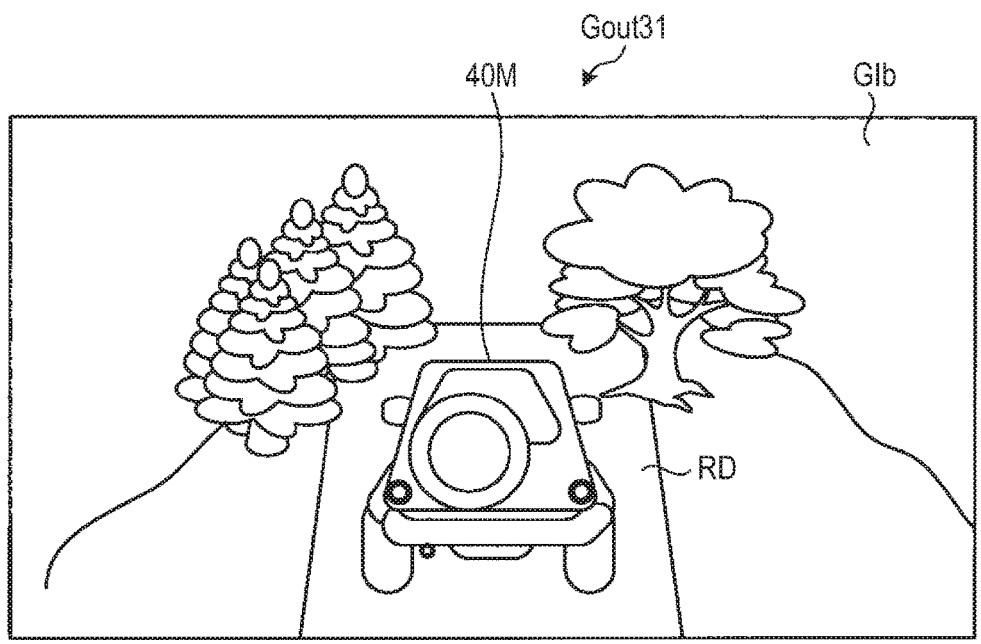
FIGS. 20A and 20B are views for explaining states of output images of the seventh exemplary embodiment.
Figure 20B:
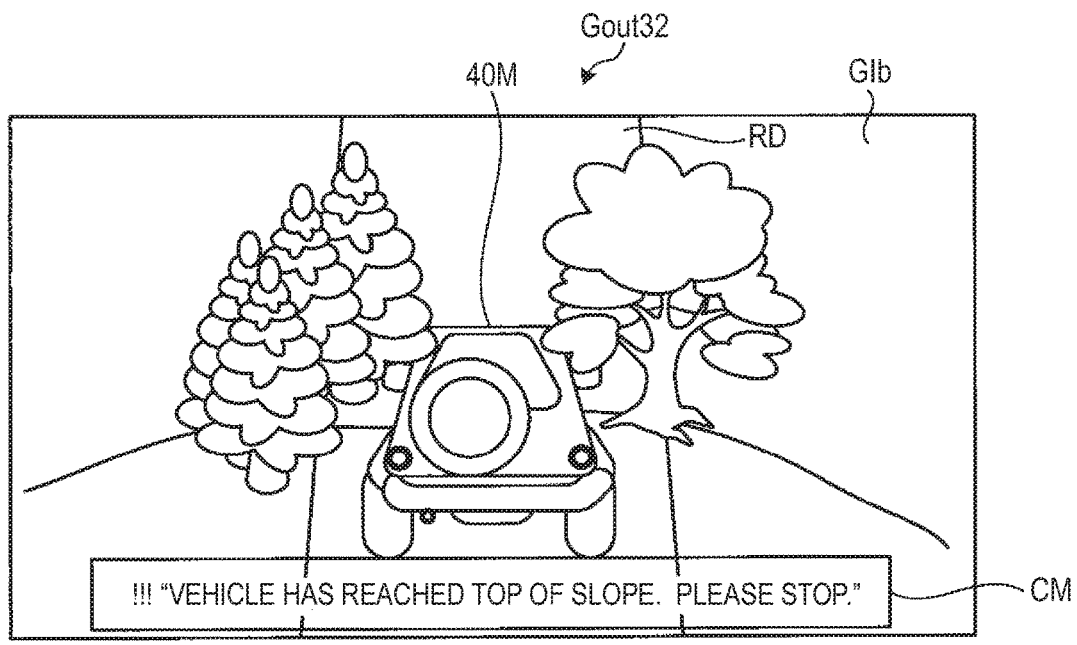

FIGS. 20A and 20B are views for explaining states of output images of the seventh exemplary embodiment.

FIG. 20A illustrates an output image Gout31 in a case in which the virtual viewpoint Ep is set to the rear side of the vehicle 40 when the vehicle 40 is present at the position of the vehicle 40P.

As illustrated in FIG. 20A, in a state in which the vehicle 40 does not completely ascend the slope SLP, the road surface RD is in a state of being disconnected in the middle thereof. Therefore, in a state in which the inclination of the vehicle 40 indicates that it is highly possible that the vehicle is ascending the slope, the ECU 11 measures a distance to the road surface RD using the background image GIb of the output image Gout31 or a distance sensor such as a sonar that constitutes the non-contact measuring units 15a to 15d, and in a case in which the road surface RD is disconnected in the middle thereof, the ECU 11 determines that the vehicle is ascending the slope.

In the case in which the vehicle 40 completely ascends the slope SLP, the image capturing range of the imaging unit 12F includes the top SLPT as illustrated in FIG. 19, and thus the road surface RD is connected to a certain degree as displayed on the output image Gout32 as illustrated in FIG. 20B. Thus, the ECU 11 detects a distance using the background image GIb of the output image Gout32 or a distance sensor such as sonar that constitutes the non-contact measuring units 15a to 15d, and displays a comment CM informing that the vehicle 40 needs to be stopped because the front wheels TF reach the top SLPT.

As described above, according to the seventh exemplary embodiment, based on a relationship between the inclination of the vehicle 40 and the road surface RD when the vehicle ascends the slope, the ECU 11 displays the comment CM informing the user that the vehicle 40 needs to be stopped because the front wheels TF reach the top SLPT. As a result, it is possible to assure that the front wheels TF secure griping force so that the ascent of the slope can be completed.

In this case, it is possible to adopt a configuration in which informing sound such as a buzzer, informing voice such as an informing voice message, or the like may be provided in place of or in addition to the display in order to call the user's attention.

As described above, according to the seventh exemplary embodiment, it is possible to make the vehicle complete ascent of the slope by more reliably securing the gripping force of the front wheels TF when the front wheels TF reach the top SLPT.

[8] Eighth Exemplary Embodiment

An eighth exemplary embodiment is an exemplary embodiment in which an acceleration sensor (a part of or the entire 3-axis acceleration sensor), which detects the inclination of the vehicle 40, is broken down.

Figure 21:
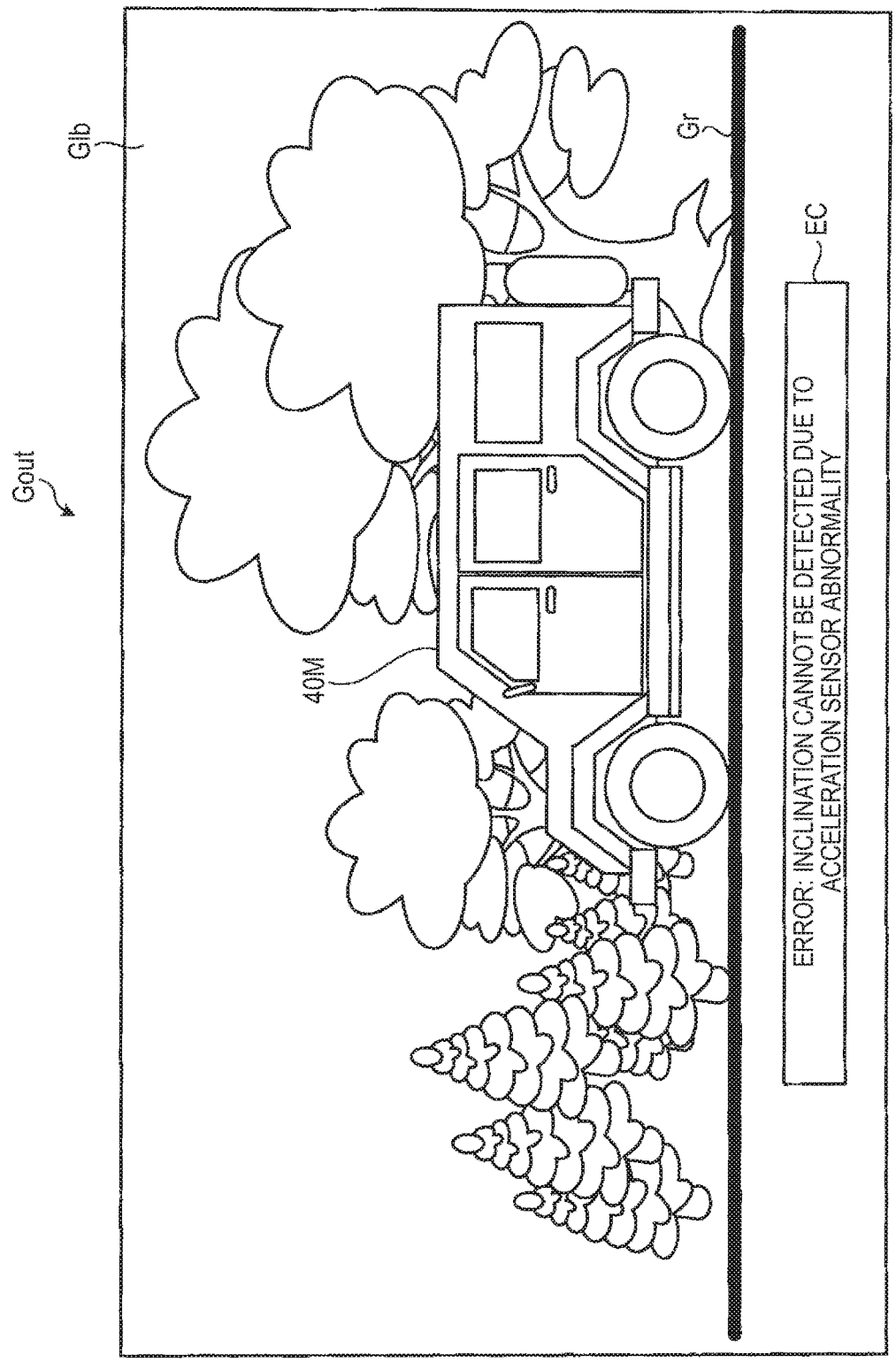
FIG. 21 is an explanatory view of an example of an output image of an eighth exemplary embodiment.

FIG. 21 is an explanatory view of an example of an output image of the eighth exemplary embodiment.

In this case, the broken-down acceleration sensor is handled in a state in which an output of the broken-down acceleration sensor is zero, and an error comment EC is displayed on the output image Gout to inform the user of the broken-down acceleration sensor.

According to the eighth exemplary embodiment, it is possible to prevent the ECU 11 from being in a state in which no calculation result exists due to the breakdown of an acceleration sensor, and it is possible to reliably inform the user that the display on the output image Gout is not accurate.

[9] Ninth Exemplary Embodiment

In the respective exemplary embodiments, the bottom surface Spg, which constitutes the virtual projection plane Sp, is handled as a simple flat surface, but a ninth exemplary embodiment is an exemplary embodiment in which the bottom surface is allocated for each tire of the vehicle 40, thereby performing a display closer to an actual road surface state.

Figure 22:
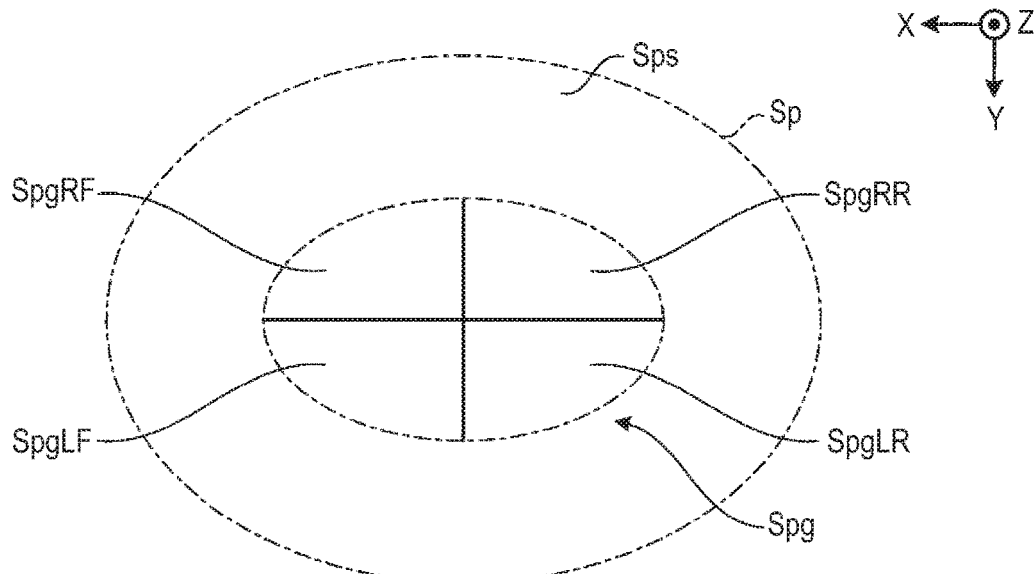
FIG. 22 is a top plan view of a virtual projection plane of a ninth exemplary embodiment.

FIG. 22 is a top plan view of a virtual projection plane of the ninth exemplary embodiment.

In the case illustrated in FIG. 22, unlike the case illustrated in FIG. 5, the virtual projection plane Sp has the bottom surface Spg which includes four sub-bottom surfaces SpgRF, SpgRR, SpgLF, and SpgLR allocated for the tires, respectively, and a side surface Sps which stands up from the bottom surface Spg, i.e. the horizontal surface Gr.

Figure 23:
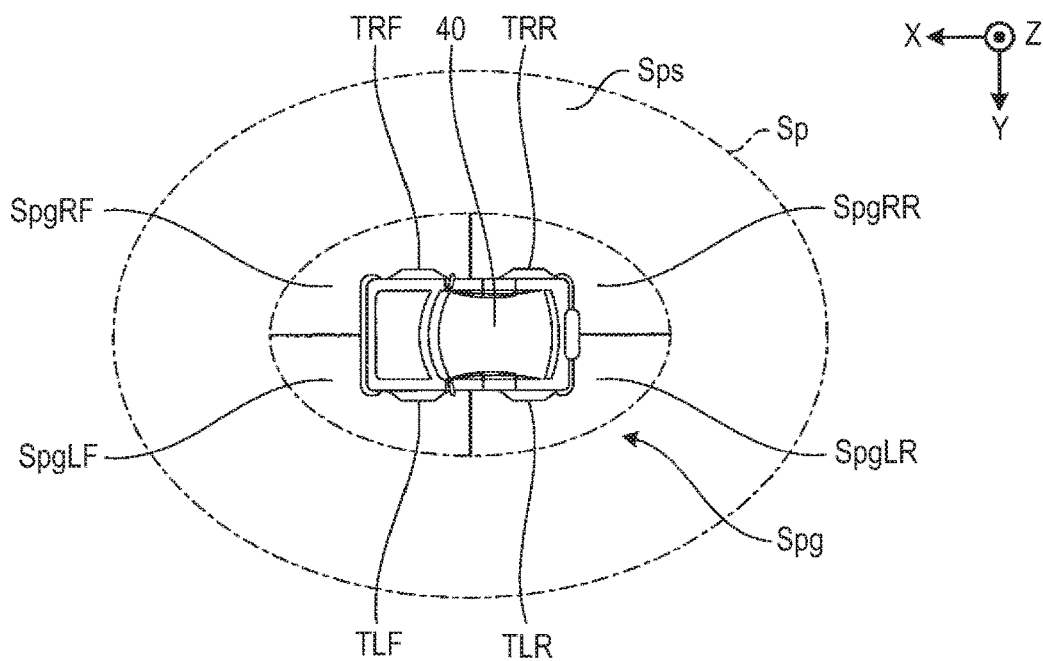
FIG. 23 is a view for explaining a relationship between a virtual projection plane and a vehicle.

FIG. 23 is a view for explaining a relationship between the virtual projection plane and the vehicle.

As illustrated in FIG. 23, the sub-bottom surface SpgRF of the virtual projection plane Sp corresponds to the right front wheel TRF of the vehicle 40, the sub-bottom surface SpgRR corresponds to the right rear wheel TRR of the vehicle 40, the sub-bottom surface SpgLF corresponds to the left front wheel TLF of the vehicle 40, and the sub-bottom surface SpgLR corresponds to the left rear wheel TLR of the vehicle 40.

Figure 24:
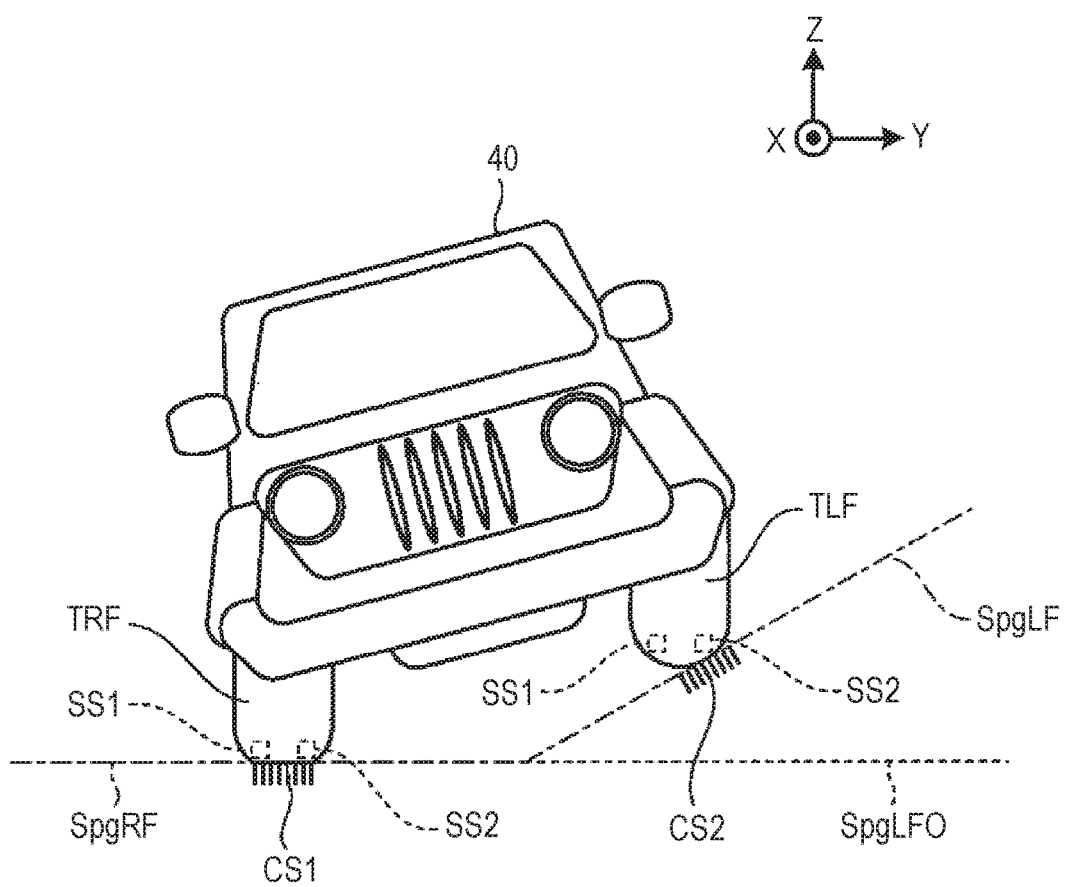
FIG. 24 is a detailed explanatory view of a ninth exemplary embodiment.

FIG. 24 is a detailed explanatory view of the ninth exemplary embodiment.

In the ninth exemplary embodiment, a pair of left and right sensors SS1 and SS2 for detecting a pressure distribution (or a shape change) of the corresponding tire (wheel) is disposed on each of the right front wheel TRF, the right rear wheel TRR, the left front wheel TLF, and the left rear wheel TLR.

In this case, each of the sensors SS1 and SS2 has a wireless communication function of performing communication with the ECU 11, and a power source function of generating electric power in the right front wheel TRF, the right rear wheel TRR, the left front wheel TLF, or the left rear wheel TLR and supplying the generated electric power to the corresponding sensors SS1 and SS2.

The ECU 11 configures the bottom surface Spg of the virtual projection plane Sp allocated for each tire in accordance with a ground contact surface (a ground contact surface CS1 and a ground contact surface CS2 in FIG. 24) detected at each of the right front wheel TRF, the right rear wheel TRR, the left front wheel TLF, and the left rear wheel TLR based on communication from the sensors SS1 and SS2, and the ECU 11 generates an output image so as to include a ground contact surface of each of the tires in respect to the four sub-bottom surfaces SpgRF, SpgRR, SpgLF, and SpgLR which may be independently inclined, or to use the sub-bottom surfaces SpgRF, SpgRR, SpgLF, and SpgLR which are inclined in parallel with the ground contact surfaces of the tires, respectively. Further, in FIG. 24, a sub-bottom surface SpgLF0 corresponds to the sub-bottom surface SpgLF when there is no inclination.

Therefore, according to the ninth exemplary embodiment, an output screen may be configured in accordance with a ground contact state of the road surface on which the vehicle 40 actually travels, and as a result, the user may more accurately recognize a traveling state of the vehicle 40.

[10] Effect of Exemplary Embodiment

As described above, according to the respective exemplary embodiments, an inclination of the vehicle 40 may be visually and easily recognized through an output image, and as a result, the user may reliably perform a required operation based on the inclination of the vehicle 40.

[11] Modification of Exemplary Embodiment

In the foregoing, the exemplary embodiments have been described, but the exemplary embodiments are examples, and are not intended to limit the scope of this disclosure. The exemplary embodiment may be carried out in other various forms, and may be variously omitted, substituted, combined, and changed without departing from the subject matter of this disclosure. In addition, configurations or shapes of the respective examples may be partially changed and carried out. In addition, specifications (structures, types, directions, shapes, sizes, lengths, widths, thicknesses, heights, numbers, disposition, positions, colors, patterns, etc.) of the respective configurations or shapes may be appropriately changed and carried out.

Configurations other than the configurations disclosed in the aforementioned exemplary embodiments and modifications may be implemented. In addition, according to this disclosure, it is possible to obtain at least one of various effects or derived effects obtained by the configurations.

In the aforementioned description, the shapes of the virtual projection plane Sp may be employed in various modes.

For example, in the case in which the speed of the vehicle 40 is a first speed, it is possible to set a virtual projection plane Sp in which a portion corresponding to a distant place of the vehicle 40 steeply rises up, and in the case in which a speed of the vehicle 40 is a second speed lower than the first speed, it is possible to use a virtual projection plane that gently rises up from the vicinity of the vehicle 40 to the distant place of the vehicle 40, or a virtual projection plane in which a portion corresponding to the vicinity of the vehicle 40 steeply rises up.

The output image (display image) may be displayed by plural display devices, and may be displayed by a display device provided separately from a navigation device or the like. The display device may be a device for projecting an image onto a screen or the like on a front window, an in-vehicle screen, or the like, or may be a display panel provided on a dashboard or a center console in the vehicle. Further, the display panel may be provided on a cockpit module, an instrument panel, a fascia, or the like.

Various shapes are set to the virtual projection plane.

For example, the side surface Sps of the virtual projection plane Sp may be a curved surface, and the side surface Sps and the bottom surface Spg of the virtual projection plane Sp may be a series of curved surfaces.

An image processing system for a vehicle according to an aspect of this disclosure includes: a viewpoint image generating unit that generates a viewpoint image viewed from a predetermined virtual viewpoint when it is assumed that a surrounding image corresponding to surrounding image data is projected on a virtual projection plane whose arrangement position has been set in advance, based on inclination information corresponding to an inclination of the vehicle and the surrounding image data obtained by capturing an image of a periphery of the vehicle; and an output image generating unit that generates and outputs output image data in order to cause a display device to display an output image in which an own vehicle model image having an inclination according to an inclination of the vehicle corresponding to the inclination information is superimposed on the viewpoint image.

With this configuration, according to the present exemplary embodiment, it is possible to easily recognize an inclination of the vehicle, for example, by using an output image corresponding to output image data, thereby assuredly operating the vehicle.

In the image processing system for a vehicle, the virtual projection plane may be set to be three-dimensionally disposed around the vehicle so as to surround the vehicle corresponding to the vehicle in a non-inclined state, and the viewpoint image generating unit may include a projection plane setting unit that sets the virtual projection plane to cancel out the inclination of the vehicle, based on the inclination information.

With this configuration, because the virtual projection plane may be always maintained in a constant direction without being affected by an inclination of the vehicle, it is possible to easily recognize the inclination of the vehicle.

In the image processing system for a vehicle, the projection plane setting unit may set the virtual projection plane to be fixed with respect to a reference horizontal surface.

With this configuration, the virtual projection plane always has a constant relationship with the horizontal surface, and as a result, it is possible to instinctively recognize an inclination of the vehicle.

In the image processing system for a vehicle, the virtual projection plane may have a bottom surface which is disposed to face a horizontal surface, and a side surface which is disposed to face a circumference of the vehicle in a horizontal direction, and the bottom surface may have a plurality of sub-bottom surfaces each of which is capable of being independently inclined to include a ground contact surface of each wheel of the vehicle or to be parallel to the ground contact surface.

With this configuration, it is possible to easily recognize a state of a road surface on which the vehicle travels.

In the image processing system for a vehicle, notification information for informing that the inclination of the vehicle in any one direction exceeds a predetermined inclination threshold value corresponding to the direction may be included in the output image.

With this configuration, it is possible to operate the vehicle to a safe side by visually recognizing the output image.

In the image processing system for a vehicle, the notification information may be configured as a change in a display mode of the own vehicle model image, or a display of additional information including a comment, or a gauge image.

With this configuration, it is possible to instinctively and assuredly recognize an inclination phenomenon of the vehicle.

In the image processing system for a vehicle, the inclination threshold value may have a first threshold value, and a second threshold value greater than the first threshold value, and the notification information in a case where the inclination of the vehicle in any one direction is larger than the first threshold value and smaller than the second threshold value and the notification information in a case where the inclination of the vehicle in any one direction is larger than the second threshold value may be different from each other.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. An image processing system for a vehicle, the image processing system comprising a processor configured to:
   generate a viewpoint image viewed from a predetermined virtual viewpoint when it is assumed that a surrounding image corresponding to surrounding image data is projected on a virtual projection plane whose arrangement position has been set in advance, based on inclination information corresponding to an inclination of the vehicle and the surrounding image data obtained by capturing an image of a periphery of the vehicle; and
   generate and output output image data in order to cause a display device to display an output image in which an own vehicle model image having an inclination according to an inclination of the vehicle corresponding to the inclination information is superimposed on the viewpoint image, wherein
   the virtual projection plane is set to be three-dimensionally arranged around the vehicle to surround the vehicle and is fixed with respect to a reference horizontal surface to be set to cancel out the inclination of the vehicle, and
   the own vehicle model image is displayed in a state of being inclined with respect to the reference horizontal surface.

2. The image processing system for a vehicle of claim 1, wherein the virtual projection plane has a bottom surface which is disposed to face a horizontal surface, and a side surface which is disposed to face a circumference of the vehicle in a horizontal direction, and
   the bottom surface has a plurality of sub-bottom surfaces each of which is capable of being independently inclined to include a ground contact surface of each wheel of the vehicle or to be parallel to the ground contact surface.

3. The image processing system for a vehicle of claim 1, wherein notification information for informing that the inclination of the vehicle in any one direction exceeds a predetermined inclination threshold value corresponding to the direction is included in the output image.

4. The image processing system for a vehicle of claim 3, wherein the notification information is configured as a change in a display mode of the own vehicle model image, or a display of additional information including a comment, or a gauge image.

5. The image processing system for a vehicle of claim 3, wherein the inclination threshold value has a first threshold value and a second threshold value greater than the first threshold value, and
   the notification information in a case where the inclination of the vehicle in any one direction is larger than the first threshold value and smaller than the second threshold value and the notification information in a case were the inclination of the vehicle in any one direction is larger than the second threshold value are different from each other.

* * * * *